United States Patent
Sugiyama et al.

(10) Patent No.: US 10,686,350 B2
(45) Date of Patent: Jun. 16, 2020

(54) MANUFACTURING METHOD OF ROTARY ELECTRIC MACHINE AND ROTARY ELECTRIC MACHINE

(71) Applicant: AISIN SEIKI KABUSHIKI KAISHA, Kariya-shi, Aichi-ken (JP)

(72) Inventors: Toshiya Sugiyama, Okazaki (JP); Yusaku Kawanishi, Kariya (JP); Akinori Hoshino, Nisshin (JP); Hiroaki Yabui, Miyoshi (JP); Koji Sato, Nagoya (JP)

(73) Assignee: AISIN SEIKI KABUSHIKI KAISHA, Kariya-shi, Aichi-ken (JP)

( * ) Notice: Subject to any disclaimer, the term of this patent is extended or adjusted under 35 U.S.C. 154(b) by 465 days.

(21) Appl. No.: 15/702,832

(22) Filed: Sep. 13, 2017

(65) Prior Publication Data
US 2018/0145569 A1 May 24, 2018

(30) Foreign Application Priority Data

Nov. 24, 2016 (JP) .................. 2016-227991

(51) Int. Cl.
| | |
|---|---|
| *H02K 3/28* | (2006.01) |
| *H02K 3/12* | (2006.01) |
| *H02K 15/00* | (2006.01) |
| *H02K 15/04* | (2006.01) |
| *H02K 15/06* | (2006.01) |
| *H02K 1/16* | (2006.01) |
| *H02K 1/27* | (2006.01) |

(Continued)

(52) U.S. Cl.
CPC ......... *H02K 15/0081* (2013.01); *H02K 1/165* (2013.01); *H02K 1/276* (2013.01); *H02K 3/12* (2013.01); *H02K 3/28* (2013.01); *H02K 15/026* (2013.01); *H02K 15/03* (2013.01); *H02K 15/0485* (2013.01); *H02K 15/067* (2013.01); *H02K 15/068* (2013.01)

(58) Field of Classification Search
CPC .................................. H02K 3/12; H02K 3/28
USPC .................................. 310/12.22, 12.31, 208
See application file for complete search history.

(56) References Cited

U.S. PATENT DOCUMENTS

2009/0243420 A1* 10/2009 Hoshino ............... H02K 3/522
                                                             310/208
2009/0267441 A1* 10/2009 Hiramatsu ............. H02K 3/28
                                                             310/208

FOREIGN PATENT DOCUMENTS

| JP | 3485199 B2 | 1/2004 |
| JP | 2011-193630 A | 9/2011 |

OTHER PUBLICATIONS

Communication dated Jun. 24, 2019, from the State Intellectual Property Office of People's Republic of China in counterpart Application No. 201710826452.9, English Translation.

* cited by examiner

*Primary Examiner* — Gary A Nash
(74) *Attorney, Agent, or Firm* — Sughrue Mion, PLLC

(57) ABSTRACT

A manufacturing method of a rotary electric machine is disclosed. The rotary electric machine includes a stator provided with a stator iron core, which is cylindrical and in which slots are formed in a circumferential direction on an inner circumferential surface, and coils of phases that are each inserted into the slots, and a movable element provided with a movable element iron core supported in a rotatable manner relative to the stator and at least a pair of movable element magnetic poles provided in the movable element iron core. The method includes: a split flux coil formation (Continued)

step; a coil setting step; a stator iron core setting step; and a split flux coil collective insertion step.

6 Claims, 12 Drawing Sheets

(51) Int. Cl.
*H02K 15/02* (2006.01)
*H02K 15/03* (2006.01)

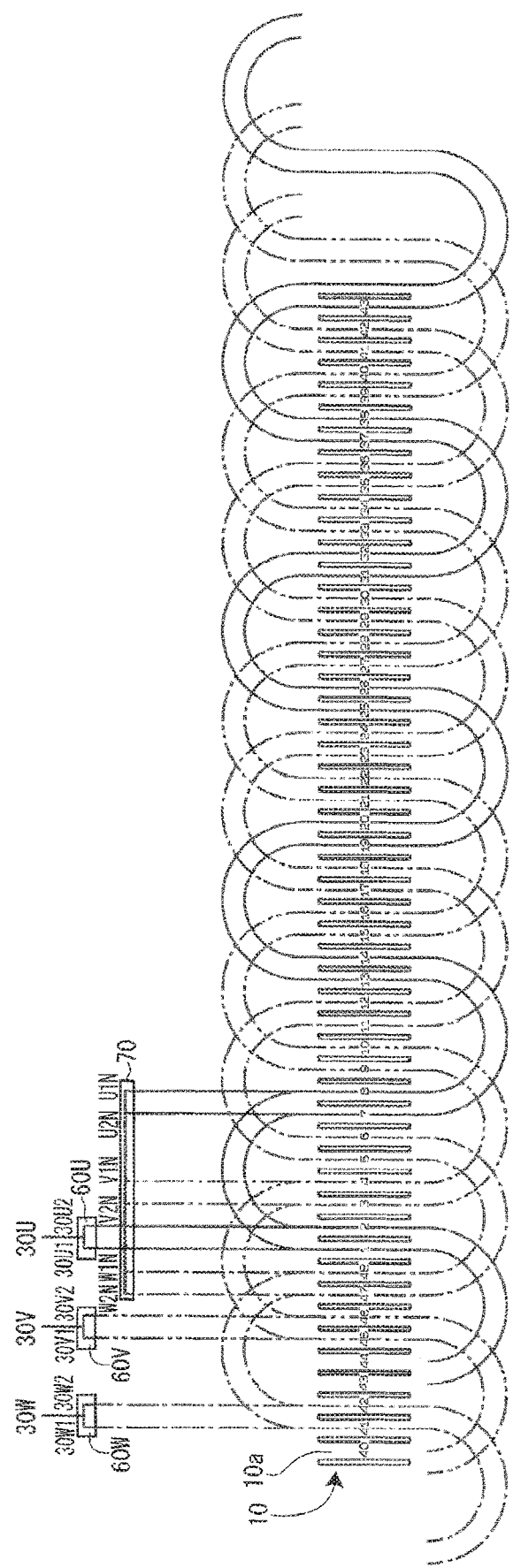

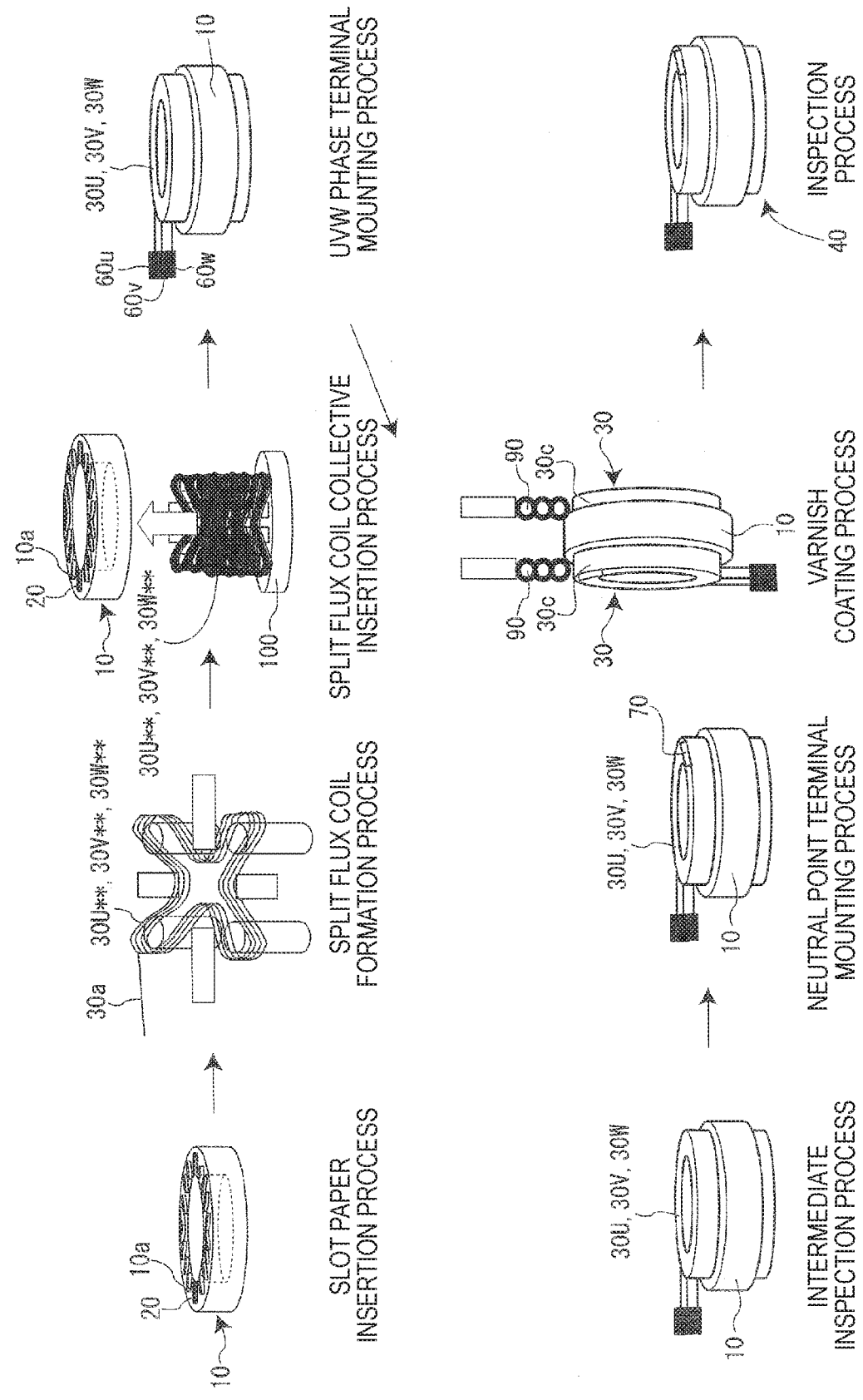

COIL SETTING PROCESS

STATOR IRON CORE SETTING PROCESS

SPLIT FLUX COIL COLLECTIVE INSERTION PROCESS

SPLIT FLUX COIL COLLECTIVE INSERTION PROCESS

MANUFACTURING METHOD OF ROTARY ELECTRIC MACHINE AND ROTARY ELECTRIC MACHINE

CROSS REFERENCE TO RELATED APPLICATIONS

This application is based on and claims priority under 35 U.S.C. § 119 to Japanese Patent Application 2016-227991, filed on Nov. 24, 2016, the entire contents of which are incorporated herein by reference.

TECHNICAL FIELD

This disclosure relates to a manufacturing method of a rotary electric machine and a rotary electric machine.

BACKGROUND DISCUSSION

In the related art, as shown in Japanese Patent No. 3485199 (Reference 1), there is a manufacturing method of a rotary electric machine that manufactures a stator by configuring so as to divide the coils of each phase into a plurality of split flux coils and sequentially inserting the split flux coils into slots of stator iron cores. In the manufacturing method, a stator is manufactured by inserting a split flux coil of the first winding of each phase into a slot corresponding to an order, and repeating of insertion of the split flux coils of, the second and subsequent winding of each phase to the slot corresponding to the order so that the coils are parallel to the split flux coils that are already inserted into the slots for each phase.

In the manufacturing method shown in Reference 1, at a point in time at which a split flux coil is inserted into a slot, a coil end of the split flux coil covers a slot into which a split flux coil to be subsequently inserted, and hinders the insertion of the split flux coil to be subsequently inserted into a slot. Therefore, in the manufacturing method of a stator shown in Reference 1, intermediate molding that deforms the coil ends of split flux coils inserted into the slots toward the outer circumferential side of the stator iron core was performed so as to avoid hindering the insertion of a split flux coil to be subsequently inserted into a slot each time a split flux coil is inserted into a slot. As a result of this, a number of steps are necessary in order to insert the coils of each phase into the slots of the stator iron core, and the manufacture of a rotary electric machine takes a long time.

Thus, a need exists for a manufacturing method of a rotary electric machine and a rotary electric machine which are not susceptible to the drawback mentioned above.

SUMMARY

A manufacturing method of a rotary electric machine according to an aspect of this disclosure includes a stator provided with a stator iron core, which is cylindrical and in which a plurality of slots are formed in a circumferential direction on an inner circumferential surface, and coils of a plurality of phases that are each inserted into the plurality of slots, and a movable element provided with a movable element iron core that is supported in a rotatable manner relative to the stator and at least a pair of movable element magnetic poles that is provided in the movable element iron core, and the method including a split flux coil formation step of, for each phase, forming split flux coils in which the coils of the plurality of phases are divided into a plurality of the split flux coils from a conducting wire, a coil setting step of performing insertion in a lamellar form between blades of a coil insertion machine by overlapping the plurality of split flux coils of each phase in a formation direction of the blades, the coil insertion machine being provided with a plurality of the blades, which are rod-shaped and disposed spatially separated from one another around a circumference, and a pusher, which is disposed on the inner side of each blade so as to face an inner side portion of each blade, and which moves in the formation direction of the blades, a stator iron core setting step of setting the stator iron core in the coil insertion machine so that a position of each of the slots conforms with a position of a gap formed between the blades, and a split flux coil collective insertion step of performing insertion in a lamellar form by pressing, with a plurality of split flux coils that are respectively inserted between the blades and that are on the pusher side, split flux coils that are closer to the stator iron core side than the plurality of split flux coils that are on the split flux coils that are on the pusher side as a result of moving the pusher to the stator iron core side, and sequentially overlapping the plurality of split flux coils of each phase in each slot in a simultaneous manner.

A rotary electric machine according to an aspect of this disclosure includes: a stator that includes a stator iron core, which is cylindrical and in which a plurality of slots are formed in a circumferential direction on an inner circumferential surface, and coils of a plurality of phases that are mounted in a state of being respectively inserted into the plurality of slots; and a movable element that includes a movable element iron core, which is supported in a rotatable manner relative to the stator and at least a pair of movable element magnetic poles that is provided in the movable element iron core, in which the coils of the plurality of phases are configured by being respectively divided into a plurality of split flux coils, the plurality of split flux coils are mounted in a state of being inserted in a lamellar form by respectively being overlapped in each slot, and an inner diameter of a coil end, at a position most separated from an end surface in a direction of projecting of the stator iron core on one side of each split flux coil mounted in a state of being inserted into the slots, is set to be smaller than the inner diameter of the stator iron core.

BRIEF DESCRIPTION OF THE DRAWINGS

The foregoing and additional features and characteristics of this disclosure will become more apparent from the following detailed description considered with the reference to the accompanying drawings, wherein:

FIG. 3 is an elementary wiring diagram of a coil having a wave winding configuration that is inserted into a stator iron core according to the present embodiment;

FIG. 4 is a step view of a manufacturing method of a rotary electric machine;

DETAILED DESCRIPTION

Structure of Rotary Electric Machine

Figure 1:
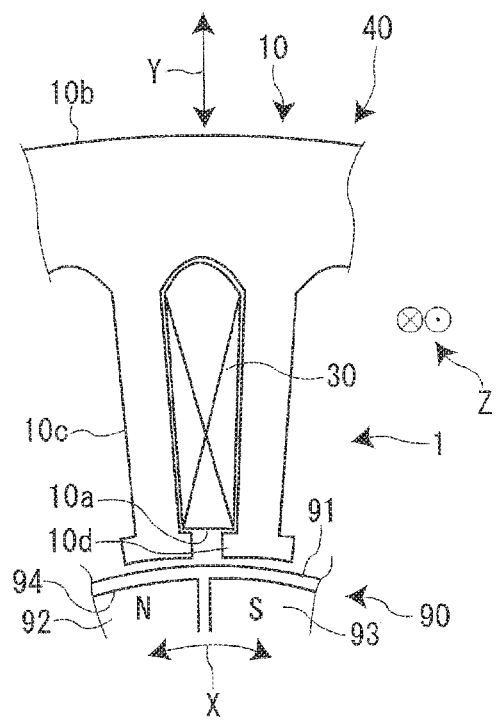
FIG. 1 is an upper surface view of a rotary electric machine.

A rotary electric machine 1 of the present embodiment is a three-phase rotary electric machine, and as shown in FIG. 1, has a stator 40 and a movable element 90. The stator 40 has a stator iron core 10, which is cylindrical and in which a plurality of slots 10a are formed in a circumferential direction on the inner circumferential surface, and a coil 30 that has a wave winding configuration and is mounted (inserted) by being wound onto the plurality of slots 10a. The movable element 90 has a movable element iron core 91 that is supported in a rotatable manner relative to the stator 40, and at least a pair of movable element magnetic poles 92 and 93 that are provided in the movable element iron core 91.

In the present embodiment, 48 slots 10a are formed in the stator iron core 10. In addition, in the present embodiment, the movable element iron core 91 is provided with four pairs of the movable element magnetic poles 92 and 93.

In this instance, a rotation direction of the movable element 90 relative to the stator 40 will be defined as a first direction (an arrow X direction). In addition, a depth direction of the plurality of (48) slots 10a will be defined as a second direction (an arrow Y direction). Furthermore, a direction that is orthogonal to both the first direction (the arrow X direction) and the second direction (the arrow Y direction) will be defined as a third direction (an arrow Z direction). The first direction (the arrow X direction) is equivalent to a direction that runs parallel to the circumferential direction of the rotary electric machine 1, and is equivalent to the rotation direction of the movable element 90.

The stator iron core 10 is formed as a result of a thin plate form electromagnetic steel sheet (for example, a silicon steel sheet) being layered a plurality of times in the third direction (the arrow Z direction). The stator iron core 10 is provided with a back yoke section 10b, and a plurality of (48 in the present embodiment) stator magnetic pole sections 10c that are formed in an integral manner with the back yoke section 10b. The back yoke section 10b is formed running parallel to the first direction (the arrow X direction), and each stator magnetic pole section 10c is formed so as to project from the back yoke section 10b in the second direction (the arrow Y direction) (an axial direction of the rotary electric machine 1).

The slots 10a are formed between stator magnetic pole sections 10c and 10c that are adjacent in the first direction (the arrow X direction). A projection section 10d, which projects on the side of an adjacent stator magnetic pole section 10c, or in other words, in the first direction (the arrow X direction), is formed at a tip end of each stator magnetic pole section 10c, or in other words, in an opening section of each slot 10a.

The movable element iron core 91 of the movable element 90 is formed in a columnar form as a result of a thin plate form electromagnetic steel sheet (for example, a silicon steel sheet) being layered a plurality of times in the third direction (the arrow Z direction). A shaft (not illustrated in the drawings) is provided in the movable element iron core 91. The shaft passes through the axial center of the movable element iron core 91 in the third direction (the arrow Z direction). Both end sections in the third direction (the arrow Z direction) of the shaft are supported in a rotatable manner by a bearing material (not illustrated in the drawings). As a result of this, the movable element iron core 91 is provided in a rotatable manner relative to the stator 40.

The four pairs of the movable element magnetic poles 92 and 93 are embedded in the movable element iron core 91. More specifically, a plurality of magnet accommodation sections 94 are formed in the movable element iron core 91 at equally spaced intervals in the first direction (the arrow X direction). Further, permanent magnets having a predetermined number of magnetic pole pairs (four magnetic pole pairs in the present embodiment) are embedded in the plurality of magnet accommodation sections 94. The movable element 90 rotates relative to the stator 40 as a result of a rotating magnetic field that is generated in the permanent magnets and the stator 40.

For example, a publicly-known ferrite-based magnet or rare earth-based magnet can be used in the permanent magnets. In addition, the method of manufacturing the permanent magnets is not limited. For example, a resin bond magnet or a sintered magnet can be used in the permanent magnets. For example, a resin bond magnet is formed by mixing a ferrite-based raw material magnet powder, a resin, and the like, and performing casting on the movable element iron core 91 by using injection molding. For example, a sintered magnet is formed by compression molding a rare earth-based raw material magnet powder and sintering at high temperature. Additionally, the pairs of movable element magnetic poles 92 and 93 can be configured so as to be surface magnet types in which the permanent magnets are provided on the surface (the outer circumferential surface) of the movable element iron core 91 facing each projection section 10d of the stator iron core 10. In addition, in FIG. 1, among the pair of movable element magnetic poles 92 and 93, a movable element magnetic pole provided with one polarity (for example, an N pole) is shown by the movable element magnetic pole 92, and a movable element magnetic pole provided with the other polarity (for example, an S pole) is shown by the movable element magnetic pole 93.

The coil 30 is formed as a result of winding a conducting wire 30a such as copper. The surface of the conducting wire 30a is covered by an insulation layer such as enamel. The coil 30 is provided with three phases of coils; namely a U-phase coil 30U, a V-phase coil 30V, and a W-phase coil 30W. Since the rotary electric machine 1 of the present embodiment is a three-phase rotary electric machine, the phase of the U-phase coil 30U, the V-phase coil 30V, and the W-phase coil 30W are shifted by 120° in an electrical angle.

Figure 2:
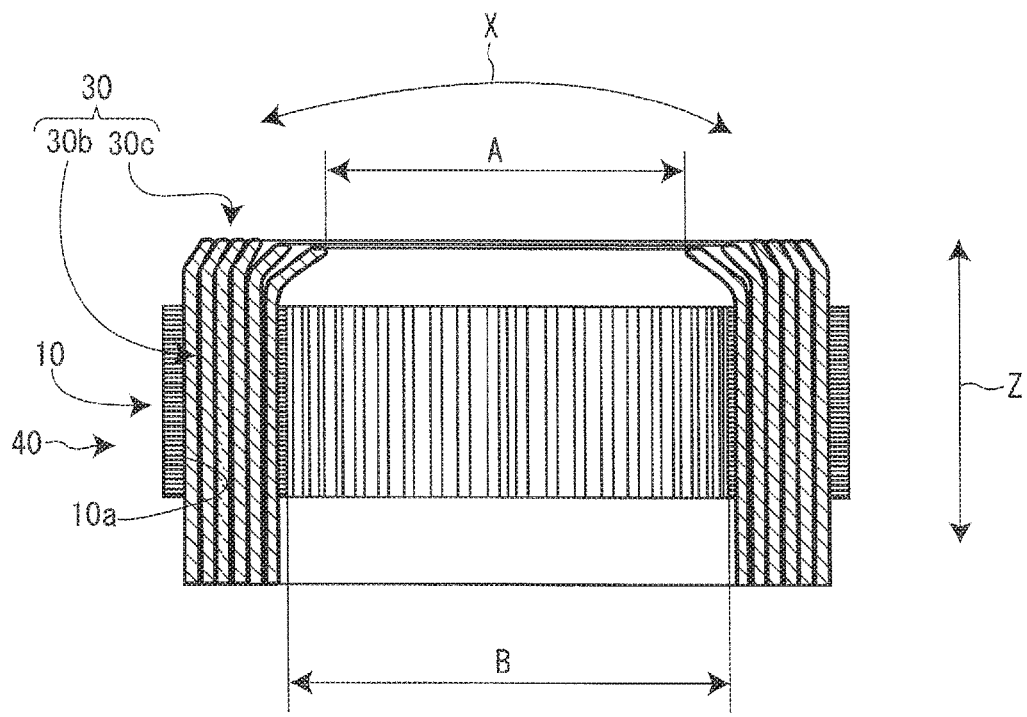
FIG. 2 is a cross-sectional view of a stator.

As shown in FIG. 2, the coil 30 has coil sides 30b and coil ends 30c. The coil side 30b and the coil end 30c are formed in an integral manner. The coil sides 30b refer to locations that are accommodated in the slots 10a of the stator iron core 10. The coil ends 30c refer to locations at which coil sides 30b and 30b on one end side (the upper side of the paper surface in FIG. 2) in the third direction (the arrow Z direction) of a coil side 30b and coil sides 30b and 30b on the other end side (the lower side of the paper surface in FIG. 2) in the third direction (the arrow Z direction) of the coil side 30b are alternately connected so as to constitute a wave winding configuration. In other words, the coil ends 30c are folded over portions of the coil 30 that are inserted into the slots 10a of the stator iron core 10, and are portions that project from the stator iron core 10 in an axis line direction.

Elementary Wiring Diagram of Coil

An elementary wiring diagram of the coil will be described below using FIG. 3. As shown in FIG. 3, in the present embodiment, the coils 30U, 30V, and 30W of each phase have a wave winding configuration. The U-phase coil 30U is configured by a first U-phase coil 30U1 and a second U-phase coil 30U2. In addition, the V-phase coil 30V is configured by a first V-phase coil 30V1 and a second V-phase coil 30V2. In addition, the W-phase coil 30W is configured by a first W-phase coil 30W1 and a second W-phase coil 30W2.

One end of the first U-phase coil 30U1 and one end of the second U-phase coil 30U2 are connected by a U-phase terminal 60U. One end of the first V-phase coil 30V1 and one end of the second V-phase coil 30V2 are connected by a V-phase terminal 60V. One end of the first W-phase coil 30W1 and one end of the second W-phase coil 30W2 are connected by a W-phase terminal 60W.

The other end U1N of the first U-phase coil 30U1, the other end U2N of the second U-phase coil 30U2, the other end V1N of the first V-phase coil 30V1, the other end V2N of the second V-phase coil 30V2, the other end W1N of the first W-phase coil 30W1, and the other end W2N of the second W-phase coil 30W2 are connected by a neutral point terminal 70.

As shown in FIG. 3, the first U-phase coil 30U1, the second U-phase coil 30U2, the first V-phase coil 30V1, the second V-phase coil 30V2, the first W-phase coil 30W1, and the second W-phase coil 30W2 are inserted into each slot 10a of the stator iron core 10. The first U-phase coil 30U1 and the second U-phase coil 30U2 are inserted into adjacent slots 10a. The first V-phase coil 30V1 and the second V-phase coil 30V2 are inserted into adjacent slots 10a. The first W-phase coil 30W1 and the second W-phase coil 30W2 are inserted into adjacent slots 10a.

Figure 7:
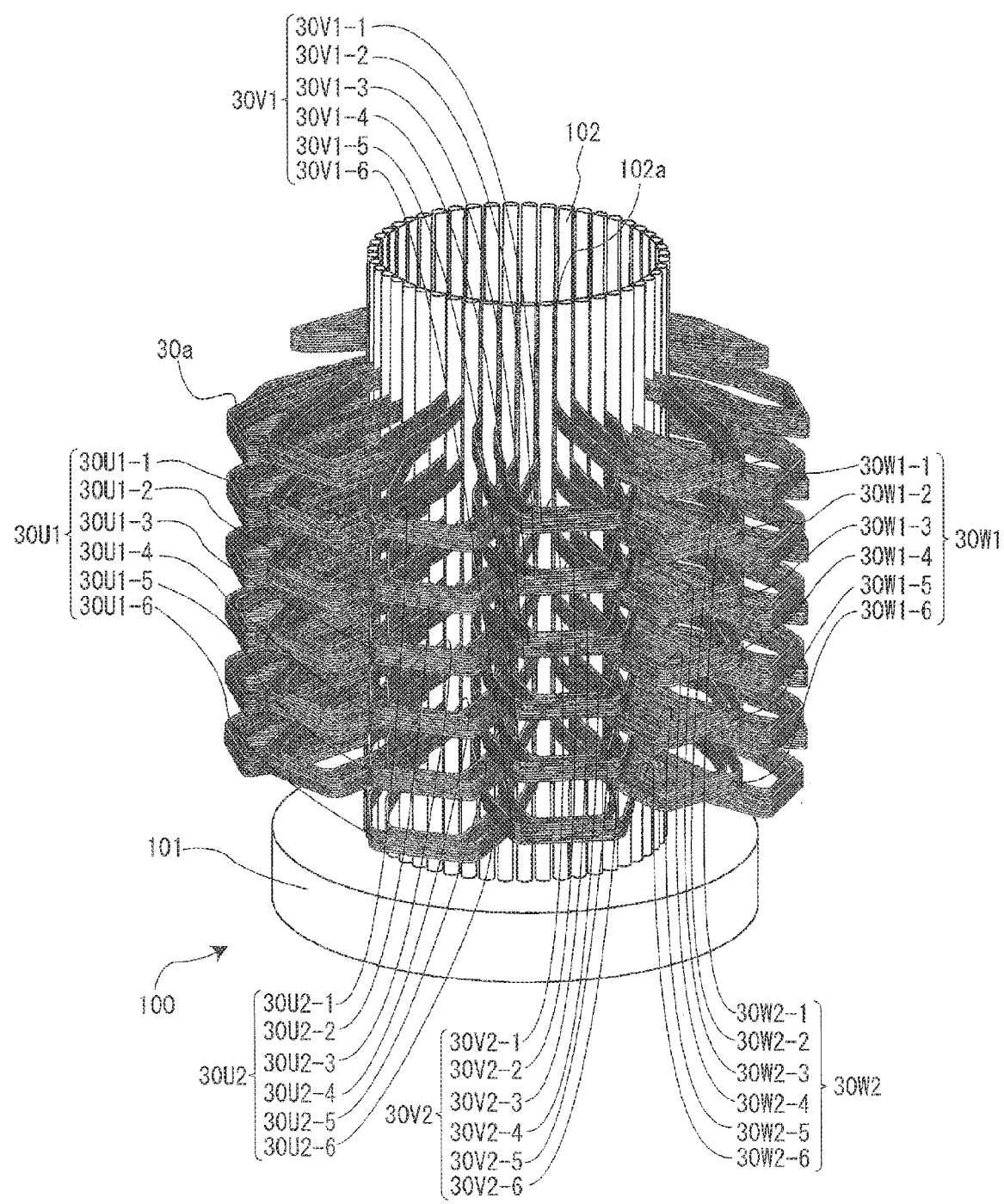
FIG. 7 is a perspective view of a state in which the split flux coils of each phase are set in a coil insertion machine.

In the present embodiment, as shown in FIG. 7, the first U-phase coil 30U1 is divided into a plurality of first U-phase split flux coils 30U1-1 to 30U1-6 when inserted into each slot 10a by a coil insertion machine 100. In the same manner, the second U-phase coil 30U2 is divided into a plurality of second U-phase split flux coils 30U2-1 to 30U2-6. In the same manner, the first V-phase coil 30V1 is divided into a plurality of first V-phase split flux coils 30V1-1 to 30V1-6. In the same manner, the second V-phase coil 30V2 is divided into a plurality of second V-phase split flux coils 30V2-1 to 30V2-6. In the same manner, the first W-phase coil 30W1 is divided into a plurality of first W-phase split flux coils 30W1-1 to 30W1-6. In the same manner, the second W-phase coil 30W2 is divided into a plurality of second W-phase split flux coils 30W2-1 to 30W2-6.

Overview of Manufacturing Method of Rotary Electric Machine

Next, an overview of a manufacturing method of the rotary electric machine 1 (the stator 40) will be described using FIG. 4. In the following description, the first U-phase split flux coils 30U1-1 to 30U1-6 and the second U-phase split flux coils 30U2-1 to 30U2-6 will be abbreviated to the split flux coils **30U\*\*. In a similar manner, the first V-phase split flux coils 30V1-1 to 30V1-6 and the second V-phase split flux coils 30V2-1 to 30V2-6 will be abbreviated to the split flux coils 30V\*\*. In a similar manner, the first W-phase split flux coils 30W1-1 to 30W1-6 and the second W-phase split flux coils 30W2-1 to 30W2-6 will be abbreviated to the split flux coils 30W\*\***.

Firstly, in a slot paper insertion step, slot paper 20, the cross-sectional shape of which is folded into a U-shape, is inserted inside each slot 10a of the stator iron core 10. The slot paper 20 surrounds the periphery of the coils 30U, 30V, and 30W of each phase inside the slots 10a, and insulates the coils 30U, 30V, and 30W of each phase from the stator iron core 10.

Next, in a split flux coil formation step, the respective split flux coils **30U\*\*, 30V\*\*, and 30W\*\* of each phase UVW are formed from the conducting wire 30a**. The split flux coil formation step will be described in detail later.

Next, in a split flux coil collective insertion step, firstly, the plurality of split flux coils **30U\*\*, 30V\*\*, and 30W\*\* of each phase UVW, which are formed in the split flux coil formation step, are set in the coil insertion machine 100. Next, the split flux coils 30U\*\*, 30V\*\*, and 30W\*\* of each phase UVW are simultaneously inserted into the slots 10a of the stator iron core 10 in a collective manner by the coil insertion machine 100. In this manner, in the present embodiment, in a different manner from manufacturing methods of stators of the related art, the split flux coils 30U\*\*, 30V\*\*, and 30W\*\* of each phase UVW are simultaneously inserted into the slots 10a of the stator iron core 10** in a collective manner. The split flux coil collective insertion step will be described in detail later.

Next, in a UVW phase coil terminal mounting step, the U-phase terminal 60U, the V-phase terminal 60V, and the W-phase terminal 60W are respectively mounted at the ends of the split flux coils **30U\*\*, 30V\*\*, and 30W\*\* of each phase UVW. In the UVW phase coil terminal mounting step, the split flux coils 30U\*\*, 30V\*\*, and 30W\*\* of each phase UVW are coupled, and the U-phase coil 30U, the V-phase coil 30V, and the W-phase coil 30W** are respectively formed.

Next, in an intermediate inspection step, a current is respectively induced in the U-phase coil 30U, the V-phase coil 30V, and the W-phase coil 30W, and inspection of insulation of the U-phase coil 30U, the V-phase coil 30V, and the W-phase coil 30W from the stator iron core 10 is performed.

Next, in a neutral point mounting step, the neutral point terminal 70 is mounted on the other ends of the U-phase coil 30U, the V-phase coil 30V, and the W-phase coil 30W. In the neutral point mounting step, the other ends of the U-phase coil 30U, the V-phase coil 30V, and the W-phase coil 30W are linked to one another.

Next, in a varnish coating step, the coil ends 30c of the coil 30 are coated with a varnish.

Next, in an inspection step, the quality of the manufactured stator 40 is determined by inspecting the characteristics of the manufactured stator 40, and the manufacture of the stator 40 is completed.

Split Flux Coil Formation Process

Figure 5A:
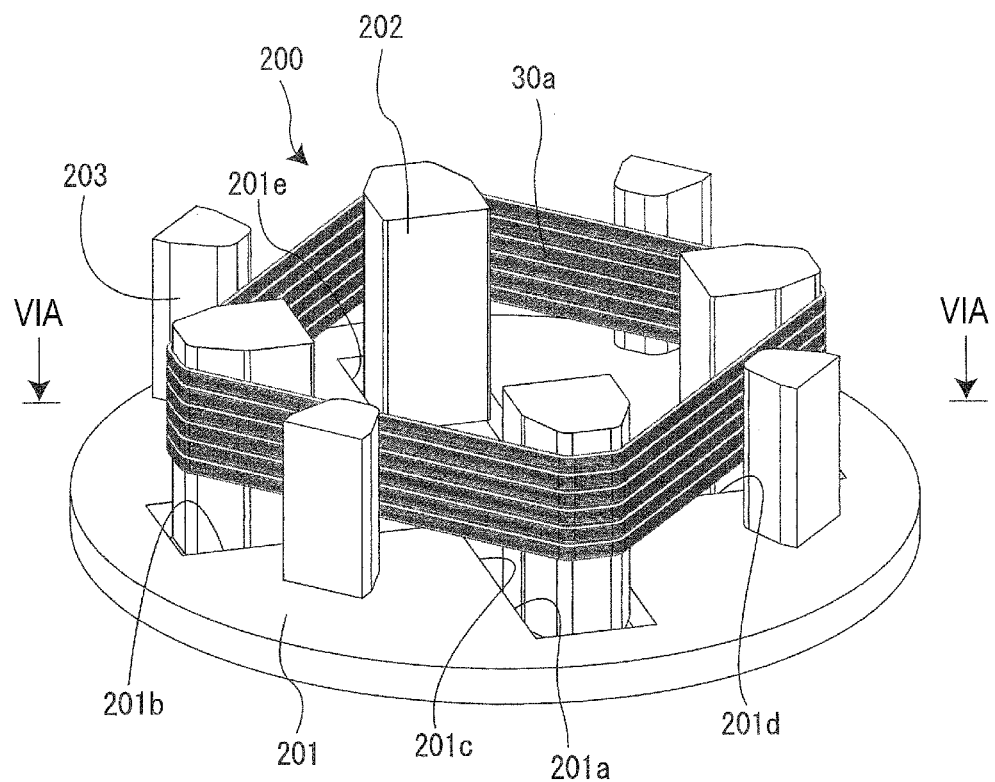
FIG. 5A is a perspective view of a coil formation machine, and is a view that shows a state before forming split flux coils.
Figure 5B:
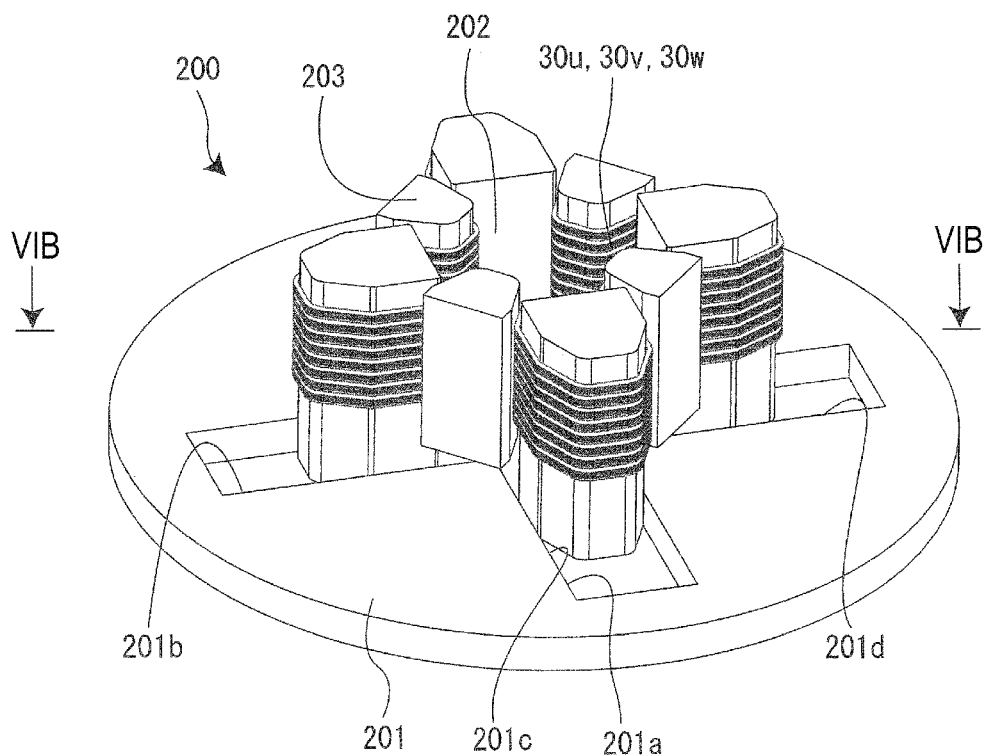
FIG. 5B is a perspective view of a coil formation machine, and is a view that shows a state after split flux coils are formed.

Next, the split flux coil formation step will be described using FIGS. 5A, 5B, 6A, and 6B. As shown in FIGS. 5A and 5B, a coil formation machine 200 that is used in the split flux coil formation step, is configured by a base member 201, four pillar members 202, and four pressing members 203. The base member 201 has a plate shape. A cross-shaped sliding hole 201a is formed passing through the base member 201. The sliding hole 201a is configured from four sliding lanes 201b to 201e. The four sliding lanes 201b to 201e are connected by a center 201a1 (shown in FIG. 6A) of the sliding hole 201a, and extend to the outer side from the center 201a1 of the sliding hole 201a. Adjacent sliding lanes 201b to 201e are orthogonal to one another.

In the description of the coil formation machine 200, a far side from the center 201a1 of the sliding hole 201a will be defined as an outer side, and a near side from the center 201a1 of the sliding hole 201a will be defined as an inner side.

Figure 6A:
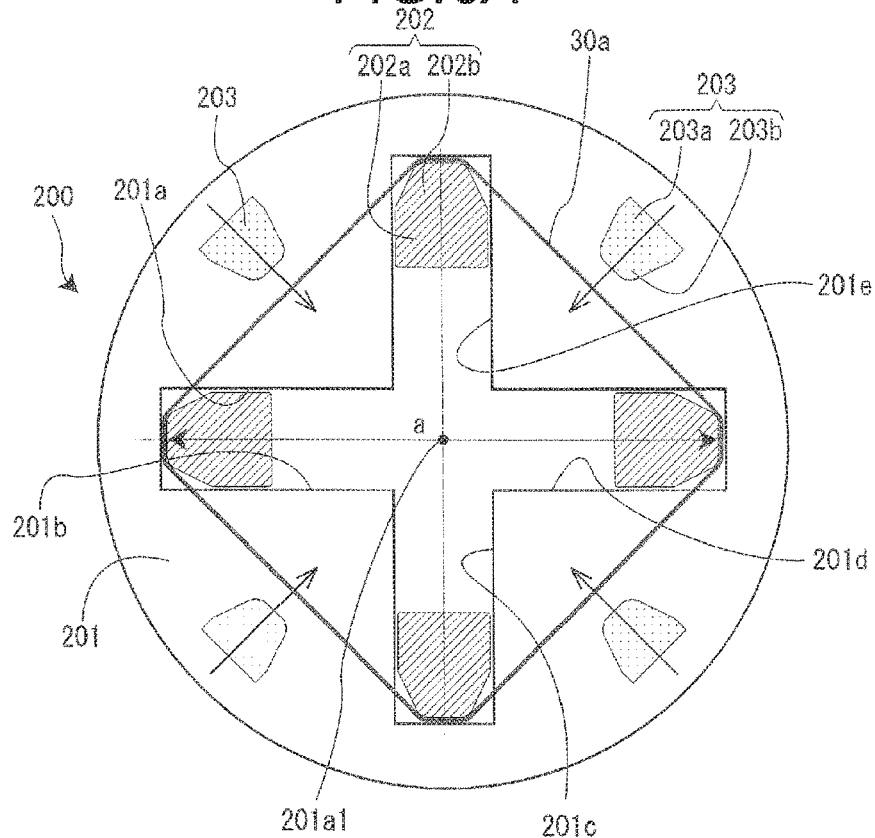
FIG. 6A is a cross-sectional view along a line VIA-VIA in FIG. 5A.
Figure 6B:
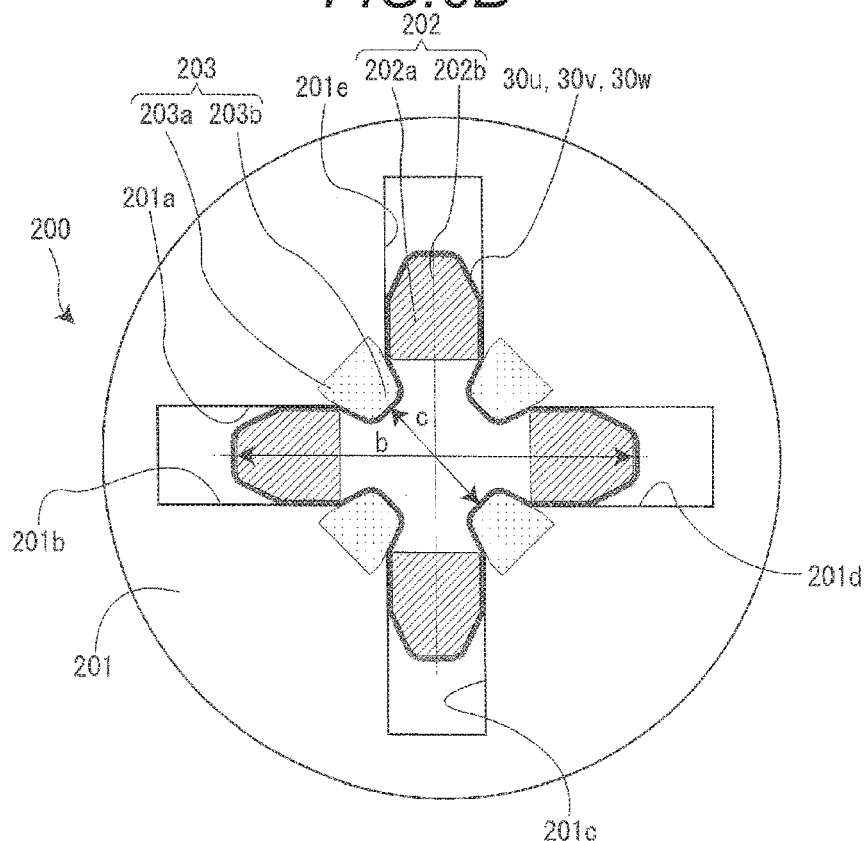
FIG. 6B is a cross-sectional view along a line VIB-VIB in FIG. 5B.

The pillar members 202 have a pillar shape. As shown in FIG. 6A, the pillar members 202 are configured from a base section 202a and a tip end section 202b. The cross-sectional shape of the base section 202a is an oblong shape. The tip end section 202b is connected to the outer side of the base section 202a (a side that is far from the center 201a1 of the sliding hole 201a). The cross-sectional shape of the tip end section 202b is an isosceles trapezoid. An edge on the tip end side (the outer side) of the tip end section 202b is set to be shorter than an edge on the base end side (inner side) of the tip end section 202b. The four pillar members 202 are respectively inserted through each sliding lane 201b to 201e, and are provided so as to be capable of sliding along each sliding lane 201b to 201e. The four pillar members 202 simultaneously slide between a first position (shown in FIGS. 5A and 6A) on the outer side of each sliding lane 201b to 201e and a second position (shown in FIGS. 5B and 6B) on the central side of each sliding lane 201b to 201e.

The pressing members 203 have a block shape. As shown in FIG. 6A, the pressing members 203 are configured from a base section 203a and a tip end section 203b. The cross-sectional shape of the base section 203a is an oblong shape. The tip end section 203b is connected to the inner side of the base section 203a (a side that is near to the center 201a1 of the sliding hole 201a). The cross-sectional shape of the tip end section 203b is an isosceles trapezoid. An edge on the tip end side (the inner side) of the tip end section 203b is set to be shorter than an edge on the base end side (outer side) of the tip end section 203b. In a case in which the four pillar members 202 are positioned in the first position, the four pressing members 203 are respectively positioned on the outer side of a central portion of a line that links the positions most on the outer side of adjust pillar members 202. The four pressing members 203 move so as to come into proximity with, or become distant from the center 201a1 of the sliding hole 201a. The pressing members 203 move in an interlocked manner with the four pillar members 202. In other words, in a case in which the four pillar members 202 are positioned in the first position, the four pressing members 203 are positioned in a third position, which, among the movement range of the pressing members 203, is a position that is furthest from a central portion of the sliding hole 201a (shown in FIGS. 5A and 6A). Meanwhile, in a case in which the four pillar members 202 are positioned in the second position, the four pressing members 203 are positioned in a fourth position, which, among the movement range of the pressing members 203, is a position that is closest to the central portion of the sliding hole 201a (shown in FIGS. 5B and 6B).

A coil formation machine 200, which forms the second U-phase split flux coils 30U2-1 to 30U2-6, the second V-phase split flux coils 30V2-1 to 30V2-6, and the second W-phase split flux coils 30W2-1 to 30W2-6 is set so that the external form of the pillar members 202 and the pressing members 203 is smaller than a coil formation machine 200 that forms the first U-phase split flux coils 30U1-1 to 30U1-6, the first V-phase split flux coils 30V1-1 to 30V1-6, and the first W-phase split flux coils 30W1-1 to 30W1-6.

As shown in FIGS. 5A and 6A, in a state in which the four pillar members 202 are in the first position and the four pressing members 203 are in the third position, the conducting wire 30a is wound onto the four pillar members 202 in a manner that links the outer side portions of adjacent pillar members 202 by a winding machine (not illustrated in the drawings). Additionally, the coil formation machine 200 itself may rotate, and the conducting wire 30a may be wound onto the four pillar members 202.

When respectively forming the first U-phase split flux coils 30U1-1 to 30U1-6, the first V-phase split flux coils 30V1-1 to 30V1-6, and the first W-phase split flux coils 30W1-1 to 30W1-6 by using the coil formation machine 200, the conducting wire 30a is wound onto the four pillar members 202 so that the number of passes of the conducting wire 30a increases in accordance with increasing terminal reference symbols.

In addition, when respectively forming the second U-phase split flux coils 30U2-1 to 30U2-6, the second V-phase split flux coils 30V2-1 to 30V2-6, and the second W-phase split flux coils 30W2-1 to 30W2-6 by using the coil formation machine 200, the conducting wire 30a is wound onto the four pillar members 202 so that the number of passes of the conducting wire 30a increases in accordance with increasing terminal reference symbols.

When respectively forming the first U-phase split flux coils 30U1-1 to 30U1-6, the first V-phase split flux coils 30V1-1 to 30V1-6, and the first W-phase split flux coils 30W1-1 to 30W1-6 by using the coil formation machine 200, a distance a (shown in FIG. 6A) between the outer sides of facing pillar members 202 in the first position decreases in accordance with increasing terminal reference symbols.

When respectively forming the second U-phase split flux coils 30U2-1 to 30U2-6, the second V-phase split flux coils 30V2-1 to 30V2-6, and the second W-phase split flux coils 30W2-1 to 30W2-6 by using the coil formation machine 200, a distance a (shown in FIG. 6A) between the outer sides of facing pillar members 202 in the first position decreases in accordance with increasing terminal reference symbols.

Next, the four pillar members 202 are moved to the second position, and the four pressing members 203 are moved to the fourth position (shown in FIGS. 5B and 6B), and the split flux coils 30U1-1 to 30U1-6, 30U2-1 to 30U2-6, 30V1-1 to 30V1-6, 30V2-1 to 30V2-6, 30W1-1 to 30W1-6, and 30W2-1 to 30W2-6 of each phase that are shown in FIG. 7 are respectively formed.

When respectively forming the first U-phase split flux coils 30U1-1 to 30U1-6, the first V-phase split flux coils 30V1-1 to 30V1-6, and the first W-phase split flux coils 30W1-1 to 30W1-6, a distance b (shown in FIG. 6B) between the outer sides of facing pillar members 202 in the second position decreases, and a distance c (shown in FIG. 6B) between the inner sides of facing pressing members 203 in the third position decreases in accordance with increasing terminal reference symbols.

When respectively forming the second U-phase split flux coils 30U2-1 to 30U2-6, the second V-phase split flux coils 30V2-1 to 30V2-6, and the second W-phase split flux coils 30W2-1 to 30W2-6 by using the coil formation machine 200, the distance b (shown in FIG. 6B) between the outer sides of facing pillar members 202 in the second position decreases, and the distance c (shown in FIG. 6B) between the inner sides of facing pressing members 203 in the third position decreases in accordance with increasing terminal reference symbols.

In the split flux coils 30U1-1 to 30U1-6, 30U2-1 to 30U2-6, 30V1-1 to 30V1-6, 30V2-1 to 30V2-6, 30W1-1 to 30W1-6, and 30W2-1 to 30W2-6 of each phase that are formed in this manner, the number of passes of the conducting wire 30a is set to increase in accordance with increasing terminal reference symbols. In other words, in the split flux coils 30U1-1 to 30U1-6, 30U2-1 to 30U2-6, 30V1-1 to 30V1-6, 30V2-1 to 30V2-6, 30W1-1 to 30W1-6, and 30W2-1 to 30W2-6 of each phase, the number of passes of the conducting wire 30a is set to decrease in accordance with decreasing terminal reference symbols.

In addition, in the split flux coils 30U1-1 to 30U1-6, 30U2-1 to 30U2-6, 30V1-1 to 30V1-6, 30V2-1 to 30V2-6, 30W1-1 to 30W1-6, and 30W2-1 to 30W2-6 of each phase that are formed in this manner, the length of a single winding of the conducting wire 30a is set to decrease in accordance with increasing terminal reference symbols.

Split Flux Coil Collective Insertion Process

In FIG. 7, the upper region of the paper surface is defined as the upper region of the coil insertion machine 100 and the lower region of the paper surface is defined as the lower region of the coil insertion machine 100.

As shown in FIGS. 8A to 8D, the split flux coil collective insertion step includes a coil setting step, a stator iron core setting step, and a split flux coil collective insertion step.

Figure 8A:
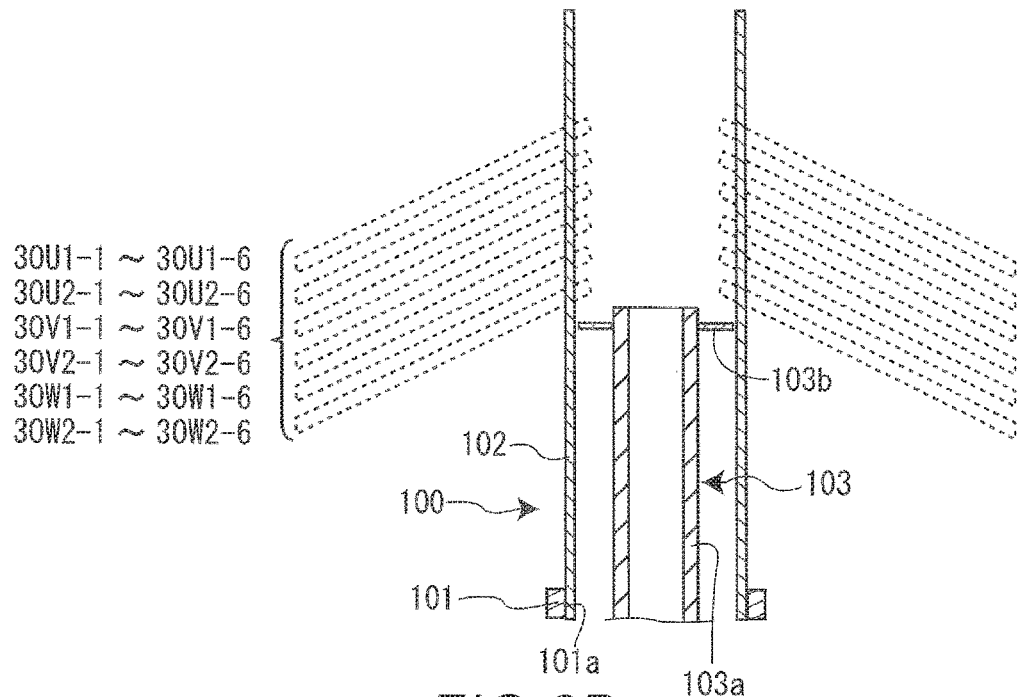
FIG. 8A is a cross-sectional view of the coil insertion machine in a coil setting step.
Figure 8B:
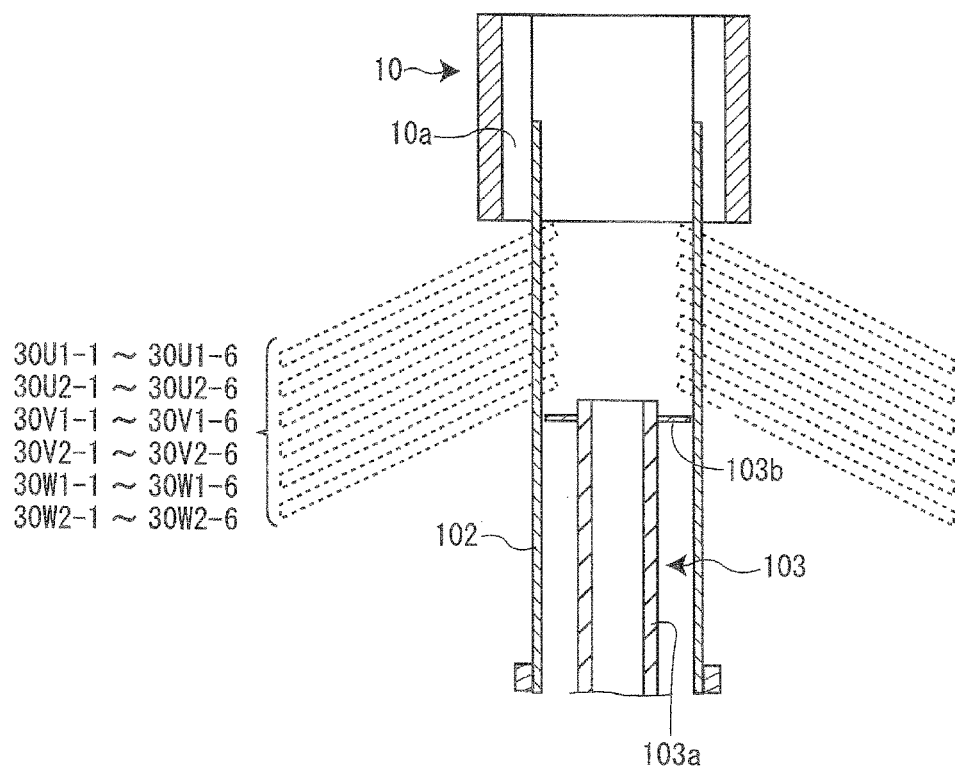
FIG. 8B is a cross-sectional view of the coil insertion machine in a stator iron core setting step.
Figure 8C:
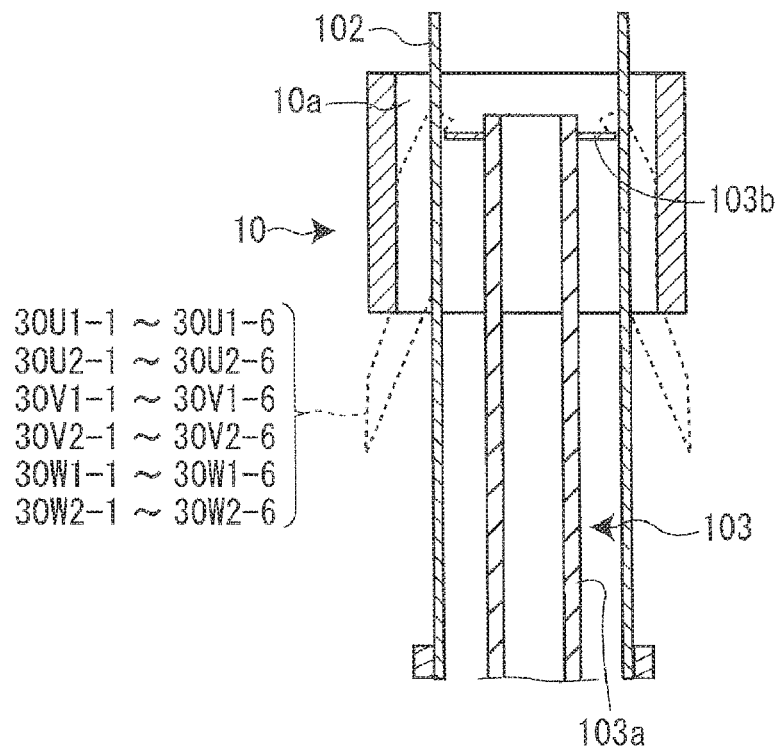
FIG. 8C is a cross-sectional view of the coil insertion machine in a split flux coil collective insertion step.
Figure 8D:
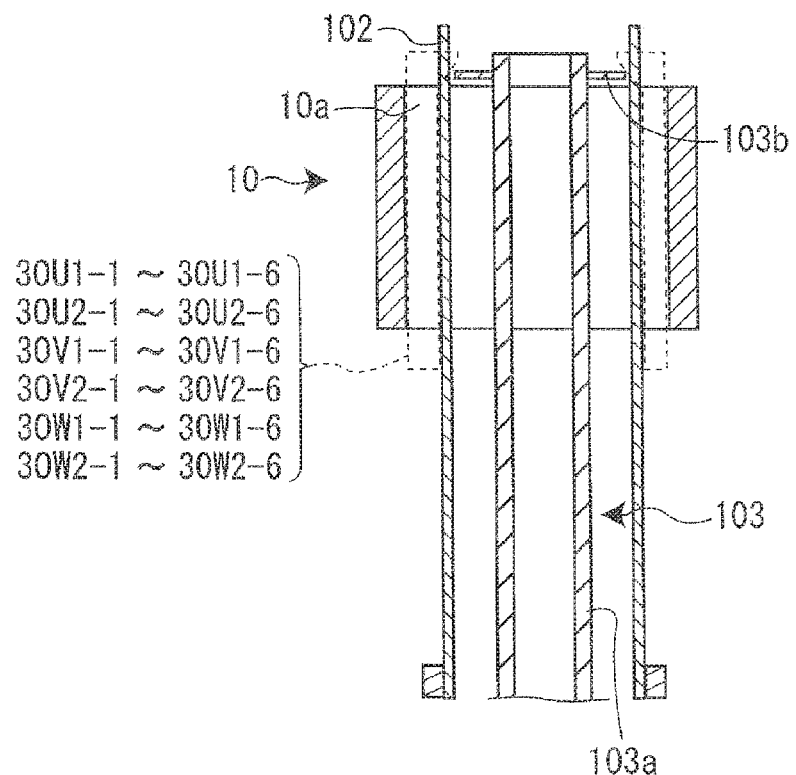
FIG. 8D is a cross-sectional view of the coil insertion machine in the split flux coil collective insertion step.

As shown in FIGS. 7 and 8A, the coil insertion machine 100 used in the split flux coil collective insertion step is configured from a base section 101, a plurality of blades 102, and a pusher 103. The base section 101 has a plate shape or a block shape, and a through hole 101a (shown in FIG. 8A) is formed in the center thereof. The blades 102 have a rod shape. The plurality of blades 102 are provided at a fixed angle on the inner circumferential surface of the through hole 101a of the base section 101, and project upward from the base section 101. In other words, the plurality of blades 102 are disposed spatially separated from one another around a circumference. The number of the blades 102 is the same as the number of the slots 10a, and in the present embodiment, is 48. Further, gaps 102a (shown in FIGS. 7 and 9) into which it is possible to insert a single pass of the conducting wire 30a only, are formed between adjacent blades 102.

Figure 9:
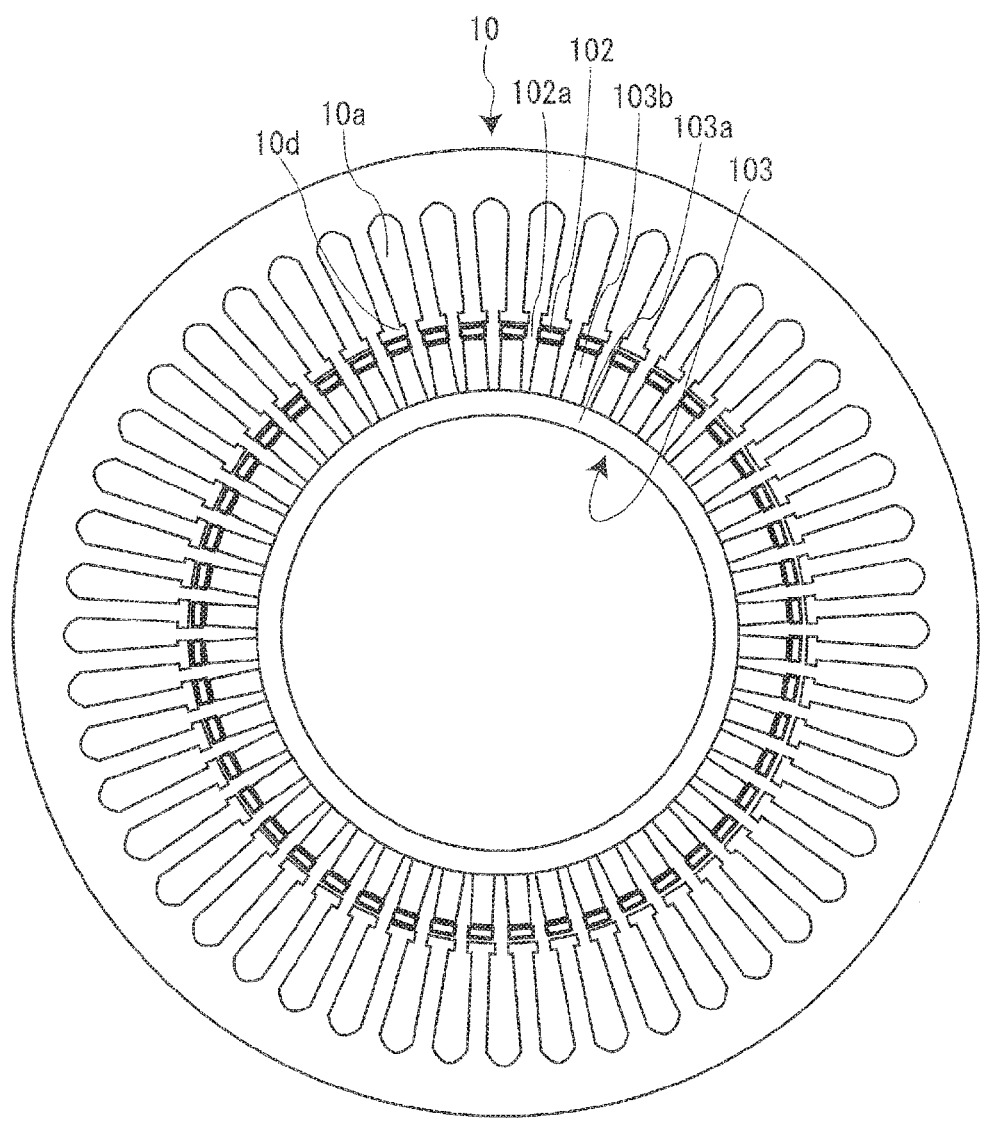
FIG. 9 is a view of an arrow IX in FIG. 8B.

As shown in FIG. 8A, the pusher 103 is provided on the inner side of the plurality of blades 102, and faces an inner side portion of the blades 102. The pusher 103 moves in the formation direction (the up-down direction) of the blades 102 as a result of a movement mechanism, which is not illustrated in the drawings. The pusher 103 is configured from a main body section 103a and a plurality of pushing sections 103b. The main body section 103a has a cylindrical shape or a columnar shape. The plurality of pushing sections 103b have an oblong plate shape, and are provided on the outer circumferential surface of the main body section 103a at a fixed angle in a radial direction of the main body section 103a (shown in FIG. 9). The number of the pushing sections 103b is the same as the number of the slots 10a, and in the present embodiment, is 48. As shown in FIG. 9, in a state in which the stator iron core 10 is set in the coil insertion machine 100, each pushing section 103b faces the inner side of each blade 102.

Each slot 10a shown in the elementary wiring diagram of the coil of FIG. 3 corresponds to a gap 102a formed between each blade 102 shown in FIG. 7. In the coil setting step, the split flux coils 30U1-1 to 30U1-6, 30U2-1 to 30U2-6, 30V1-1 to 30V1-6, 30V2-1 to 30V2-6, 30W1-1 to 30W1-6, and 30W2-1 to 30W2-6 of each phase are respectively inserted in a lamellar form (shown in FIGS. 7 and 8A) as a result of being overlapped between the blades 102 in the formation direction of the blades 102 in accordance with the elementary wiring diagram of the coil shown in FIG. 3 by a migration device (not illustrated in the drawings).

Each first U-phase split flux coil 30U1-1 to 30U1-6 and second U-phase split flux coil 30U2-1 to 30U2-6 is mounted in a state of being inserted in a lamellar form as a result of being overlapped between the blades 102 in the formation direction of the blades 102 from top to bottom in order of the terminal reference symbols thereof. Each first V-phase split flux coil 30V1-1 to 30V1-6 and second V-phase split flux coil 30V2-1 to 30V2-6 is mounted in a state of being inserted in a lamellar form as a result of being overlapped between the blades 102 in the formation direction of the blades 102 from top to bottom in order of the terminal reference symbols thereof. Each first W-phase split flux coil 30W1-1 to 30W1-6 and second W-phase split flux coil 30W2-1 to 30W2-6 is mounted in a state of being inserted in a lamellar form as a result of being overlapped between the blades 102 in the formation direction of the blades 102 from top to bottom in order of the terminal reference symbols thereof.

As shown in FIGS. 7 and 3, the second U-phase split flux coils 30U2-1 to 30U2-6 are disposed in a gap 102a that is one gap on the inner side of a gap 102a in which the first U-phase split flux coils 30U1-1 to 30U1-6 are inserted. In the same manner, the second V-phase split flux coils 30V2-1 to 30V2-6 are disposed in a gap 102a that is one gap on the inner side of a gap 102a in which the first V-phase split flux coils 30V1-1 to 30V1-6 are inserted. In the same manner, the second W-phase split flux coils 30W2-1 to 30W2-6 are disposed in a gap 102a that is one gap on the inner side of a gap 102a in which the first W-phase split flux coils 30W1-1 to 30W1-6 are inserted.

Next, in the stator iron core setting step, the stator iron core 10 is set in the coil insertion machine 100 (shown in FIG. 8B) so that the positions of the opening sections of the slots 10a conform with the positions of the gaps 102a formed between each blade 102 as shown in FIG. 9.

In the stator iron core setting step, the number of passes of the conducting wire 30a that constitutes the split flux coils 30U1-1 to 30U1-6, 30U2-1 to 30U2-6, 30V1-1 to 30V1-6, 30V2-1 to 30V2-6, 30W1-1 to 30W1-6, and 30W2-1 to 30W2-6 (hereinafter, written as the split flux coils 30) of each phase to be respectively inserted between each blade 102 is set to be smaller as the split flux coils 30 are closer to the stator iron core 10.

In addition, in the stator iron core setting step, the length of the conducting wire 30a that constitutes each split flux coil 30** to be respectively inserted between each blade 102 is set so as to decrease the further the split flux coils 30\*\* are from the stator iron core 10.

Next, in the split flux coil collective insertion step, the pusher 103 is moved to the stator iron core 10 side. When this occurs, among the split flux coils 30\*\* of each phase, a portion that projects further on the inner circumferential side than the blades 102 is pushed up to the stator iron core 10 side by each pushing section 103b of the pusher 103. When this occurs, the split flux coils 30\*\* are inserted in a lamellar form (the state of FIG. 8C) as a result of being sequentially overlapped in sequential slots 10a from split flux coils 30\*\* that are on the stator iron core 10 side (the upper side). In other words, the split flux coils of each phase that are closer to the stator iron core 10 side (the upper side) than the split flux coils 30\*\* that are respectively inserted between each blade 102, which are on the pusher 103 side (the lower side), are pressed by the split flux coils 30\*\* that are respectively inserted between each blade 102. When this occurs, a plurality of the split flux coils 30\*\* that are respectively inserted between the blades 102 are inserted in a lamellar form (the state of FIG. 8D) as a result of being sequentially overlapped in each slot 10a.

In the present embodiment, the coils 30U, 30V, and 30W of each phase are configured by respectively being divided into a plurality of split flux coils 30\*\*. As a result of this, in comparison with a configuration in which the coils 30U, 30V, and 30W of each phase are not divided, the rigidity of the split flux coils 30\*\* is low; and therefore, it is easy to deform the split flux coils 30\*\*. Therefore, the split flux coils 30\*\* that are closer to the stator iron core 10 side than the plurality of split flux coils 30\*\* that are respectively inserted between each blade 102, which are on the pusher 103 side, are pressed by the split flux coils 30\*\* that are respectively inserted between each blade 102, and it is possible to perform insertion as a result of respectively sequentially overlapping the plurality of split flux coils 30\*\* in each slot 10a in a simultaneous manner.

In addition, the number of passes of the conducting wire 30a that constitutes each split flux coil 30\*\* to be respectively inserted between each blade 102 is set to be smaller as the split flux coils 30\*\* are closer to the stator iron core 10. In other words, the number of passes of the conducting wire that constitutes each split flux coil 30\*\* mounted in a state of being inserted in a lamellar form by respectively being overlapped in each slot 10a is set so that there are fewer split flux coils 30\*\* on the outer circumferential side than split flux coils 30\*\* on the inner circumferential side. As a result of this, regarding the rigidity of the each split flux coils 30\*\*, that the split flux coils 30\*\* that are close to the stator iron core 10, or in other words, the split flux coils 30\*\* to be initially inserted in the slots 10a is less than that of the split flux coils 30\*\* to be inserted thereafter. Since the flexibility of the split flux coils 30\*\* increases as the rigidity of the split flux coils 30\*\* decreases, it is easy to insert the split flux coils 30\*\* into the slots 10a. Therefore, the split flux coils 30\*\* to be initially inserted in the slots 10a are reliably inserted into the slots 10a. In addition, it is more difficult to deform the split flux coils 30\*\* as the rigidity of the split flux coils 30\*\* increases. Therefore, it is more difficult to deform the split flux coils 30\*\* that are close to the pusher 103, or in other words, the split flux coils 30\*\* to be inserted into the slots 10a later than it is to deform the split flux coils 30\*\* that are close to the stator iron core 10. Accordingly, it is possible to perform insertion into the slots 10a by reliably pressing the split flux coils 30\*\* for which insertion was previously started with each split flux coil 30\*\* to be inserted into the slots 10a later, which are difficult to deform. As a result of this, all of the split flux coils 30\*\* are reliably inserted into each slot 10a.

Additionally, in the split flux coil collective insertion step, immediately after the above-mentioned split flux coils of each phase are inserted into each slot 10a, wedge paper 80 (shown in FIG. 10) is inserted into each slot 10a in a manner that blocks the opening sections of the slots 10a by using a wedge pusher, which is not illustrated in the drawings.

Figure 11:
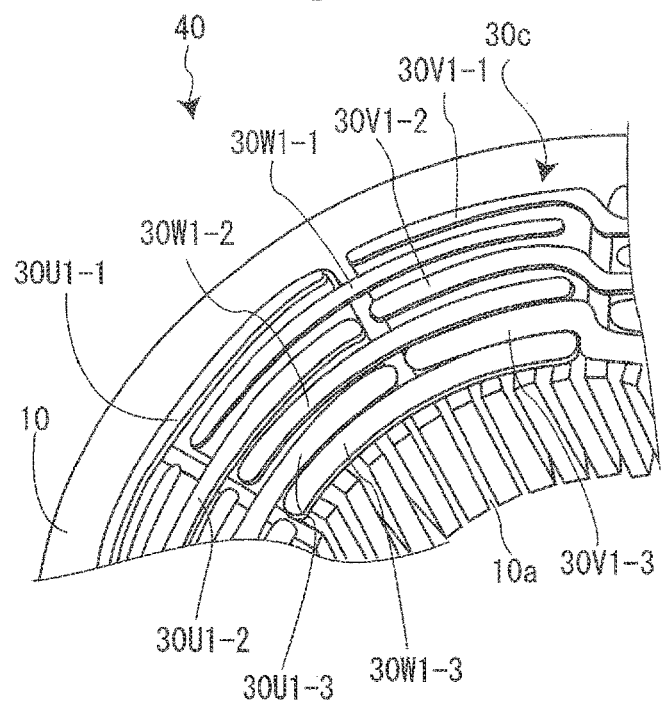
FIG. 11 is a perspective view that schematically represents the coil end section of the stator of the present embodiment.

A stator 40 manufactured in this manner, will be described below. FIG. 11 is a perspective view that schematically represents the coil ends 30c, which are folded over portions of each split flux coil 30\*\* that is inserted into the slots 10a of the stator 40, and project from an end section of the stator iron core 10 in an axis line direction. Additionally, in FIG. 11, for the sake of convenience, the coils 30U1 to 30W1 of each phase are configured so as to be divided into three split flux coils 30\*\*.

Figure 10:
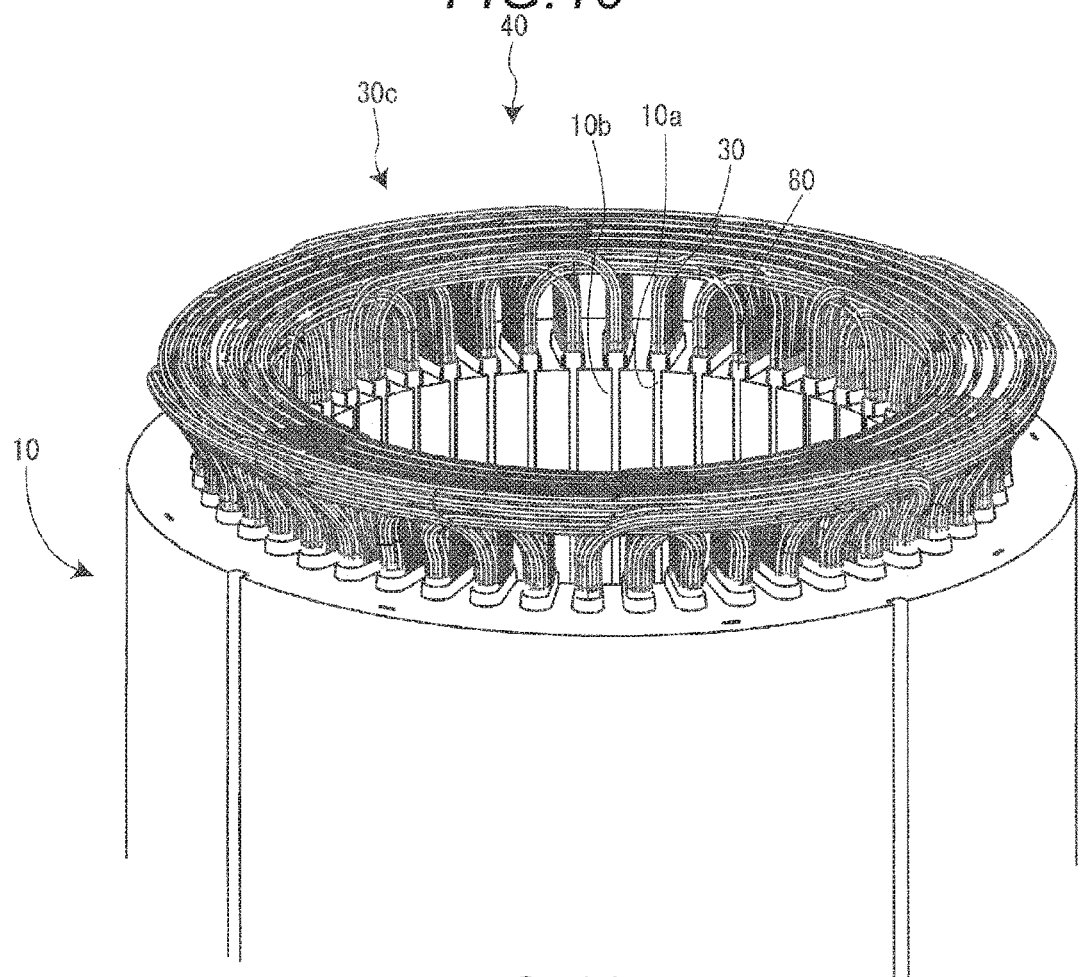
FIG. 10 is a perspective view of a coil end section of the stator.

As shown in FIG. 11, the distance between two slots 10a in which a single split flux coil 30U1-1 to 30U1-3, 30V1-1 to 30V1-3, or 30W1-1 to 30W1-3 is inserted decreases in conjunction with positioning closer to the inner side of the stator iron core 10. Therefore, if the length of the conducting wire 30a that constitutes each split flux coil is set to be the same, the projection length from the stator iron core 10 of the coil ends 30c of the split flux coils 30\*\* increases as the split flux coils are positioned closer to the inner side of the stator iron core 10. In such an instance, in the present embodiment, in the above-mentioned manner, in the stator iron core setting step, the length of the conducting wire 30a that constitutes each split flux coil 30\*\* mounted in a state of being respectively inserted between each blade 102 is set so as to decrease the further the split flux coils 30\*\* are from the stator iron core 10. In other words, the length of a single winding of the conducting wire 30a that constitutes each split flux coil 30\*\* mounted in a state of being inserted by respectively being overlapped in each slot 10a is set so that the split flux coils 30\*\* on the inner circumferential side are shorter than the split flux coils 30\*\* on the outer circumferential side. Therefore, as shown in FIG. 10, in the coil ends 30c in a state in which each split flux coil 30\*\* has been inserted into each slot 10a by the split flux coil collective insertion step, the projection amounts from the end section of the stator iron core 10 are substantially constant from the outer circumferential side to the inner circumferential side. Accordingly, a coil end molding step that presses the coil ends 30c positioned on the inner side of the stator iron core 10, or in other words, the coil ends 30c that project greatly from the end section of the stator iron core 10, and keeps the coil ends 30c to within a constant distance from the end section of the stator iron core 10 is not required.

In the present embodiment, in the above-mentioned manner, in the stator iron core setting step, the length of the conducting wire 30a that constitutes each split flux coil 30\*\* to be respectively inserted between each blade 102 is set so as to decrease the further the split flux coils 30\*\* are from the stator iron core 10, or in other words, the closer to the inner side of the stator iron core 10 the split flux coils 30\*\* are inserted into each slot 10a. As a result of this, in a state in which the split flux coils 30\*\* of each phase are inserted into each slot 10a by the split flux coil collective insertion step, as shown in FIG. 2, an inner diameter A at a position most separated in a direction of projecting from an end surface of the stator iron core 10 on one side of the coil ends 30c is set to be less than an inner diameter B of the stator iron core 10. Therefore, during the split flux coil collective insertion step, the coil ends 30c of the split flux coils 30\*\* on the outer side of the coil ends 30c of the split flux coils 30 on the inner side are not pressed to the outer side by the coil ends 30c of the split flux coils 30 on the inner side. As a result of this, a circumstance in which a film formed on the surface of the conducting wire 30a is fractured as a result of the coil ends 30c of the split flux coils 30 on the inner side pressing the coil ends 30c further on the outer side than the coil ends 30c of the split flux coils 30 on the inner side is prevented.

In the present embodiment, since the stator 40 of a rotary electric machine is even established in the state shown in FIG. 2, it is not necessary to mold the coil ends 30c that are further on the inner side than the inner diameter B of the stator iron core 10 to be further on the outer side than the inner diameter B of the stator iron core 10. Therefore, a circumstance in which a film formed on the surface of the conducting wire 30a is fractured as a result of molding the coil ends 30c that are further on the inner side than the inner diameter B of the stator iron core 10 to be further on the outer side than the inner diameter B of the stator iron core 10, is prevented.

Figure 12:
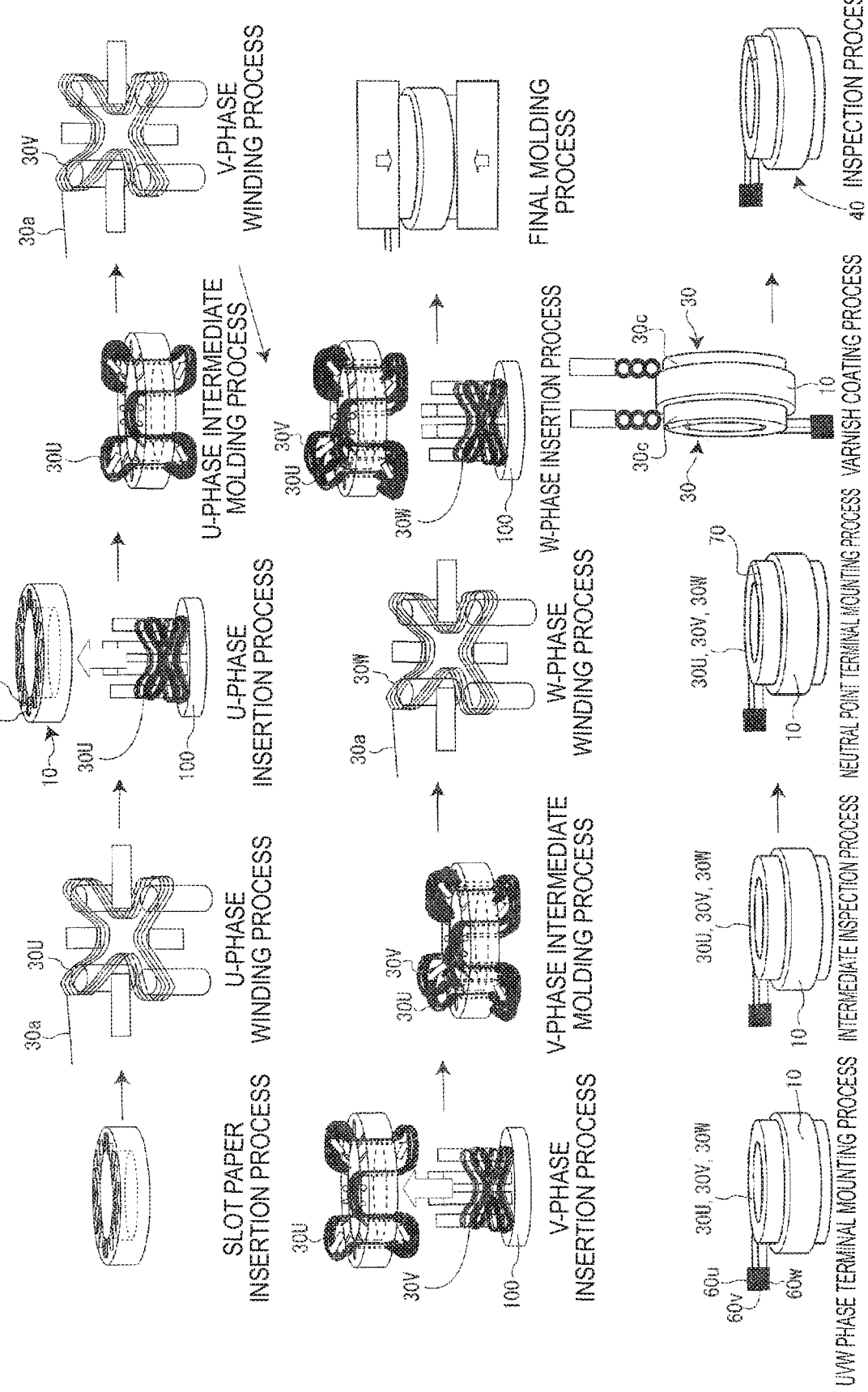
FIG. 12 is a step view of a manufacturing method of a stator of the related art.

Comparison of Manufacturing Methods of Rotary Electric Machines of Related Art and Present Embodiment In a manufacturing method of a rotary electric machine of the related art, as shown in FIG. 12, a U-phase winding step, a U-phase insertion step, a U-phase intermediate step, a V-phase winding step, a V-phase insertion step, a V-phase intermediate step, a W-phase winding step, a W-phase insertion step, and a final molding step are executed after the slot paper insertion step in order to insert the coils 30U, 30V, and 30W of each phase into the slots 10a of the stator iron core 10. The U-phase intermediate step and the V-phase intermediate step are steps that deform the coil ends 30c of the coils 30U and 30V that are inserted in the slots 10a to the outer circumferential side of the stator iron core 10 so that the coil ends do not hinder the insertion into the slots 10a of the coils 30V and 30W to be subsequently inserted into the slots 10a. In addition, the final molding step is a step that deforms the coil ends 30c that are deformed to the outer circumferential side of the stator iron core 10 by the U-phase intermediate step and the V-phase intermediate step to the inner circumferential side of the stator iron core 10, and returns to a state prior to the U-phase intermediate step and the V-phase intermediate step are executed.

Meanwhile, in the manufacturing method of the rotary electric machine 1 of the present embodiment, as shown in FIG. 4, in the split flux coil collective insertion step, the split flux coils 30U, 30V, and 30W** of each phase UVW are collectively inserted into each slot 10a of the stator iron core 10. Therefore, in the manufacturing method of the rotary electric machine 1 of the present embodiment, in comparison with the manufacturing method of the rotary electric machine 1 of the related art, which is shown in FIG. 12, it is not necessary to sequentially insert the coils 30U, 30V, and 30W of each phase; namely the U-phase, the V-phase, and the W-phase, into the slots 10a of the stator iron core 10; and therefore, the U-phase intermediate step and the V-phase intermediate step are not required. In addition, in the manufacturing method of the stator of the present embodiment, since the U-phase intermediate step and the V-phase intermediate step are not required, the final molding step that returns the coil ends 30c deformed to the outer circumferential side of the stator iron core 10 by the U-phase intermediate step and the V-phase intermediate step to the state prior to the U-phase intermediate step and the V-phase intermediate step are executed is not required. In this manner, in the manufacturing method of the stator of the present embodiment, in comparison with the manufacturing method of a stator of the related art, it is possible to greatly reduce the steps in order to insert the coils 30 into the slots 10a of the stator iron core 10.

Effects of Present Embodiment

As can be understood from the above-mentioned description, the coils 30U, 30V, and 30W are divided into the plurality of split flux coils 30, and in the split flux coil collective insertion step, the split flux coils 30 that are closer to the stator iron core 10 side than a plurality of the split flux coils 30 that are respectively inserted between each blade 102, which are on the pusher 103 side, are pressed by the split flux coils 30 on the pusher 103 side as a result of moving the pusher 103 to the stator iron core 10 side, and the plurality of the split flux coils 30 of each phase are inserted in a lamellar form as a result of being sequentially overlapped in each slot 10a in a simultaneous manner. In this manner, since the coils 30U, 30V, and 30W are divided in the plurality of split flux coils 30, the rigidity of the split flux coils 30 is lower than that of coils 30U, 30V, and 30W that are not divided; and therefore, it is easy to deform the split flux coils 30. Therefore, in the split flux coil collective insertion step, it is possible to perform insertion in a lamellar form as a result of overlapping the split flux coils 30** of all of the phases in each slot 10a of the stator iron core 10 in a simultaneous manner. As a result of this, it is possible to greatly reduce the steps required in order to insert the coil 30 of each phase. In addition, in the manner of the related art, intermediate molding that deforms the coil ends 30c on one side of the coils 30U, 30V, and 30W inserted into the slots 10a to the outer circumferential side of the stator iron core 10 in order to avoid hindering the insertion of the coils 30U, 30V, and 30W to be subsequently inserted into the slots 10a after inserting the coils 30U, 30V, and 30W of a single phase into the slots 10a of the stator iron core 10, is not required. In this manner, it is possible to greatly reduce the steps required in order to insert the coils 30U, 30V, and 30W of each phase; and therefore, it is possible to provide a manufacturing method of the rotary electric machine 1 that is capable of manufacture in a shorter period of time.

In addition, in the stator iron core setting step, the number of passes of the conducting wire that constitutes each split flux coil 30 respectively inserted in a lamellar form between each blade 102 is set to be smaller as the split flux coils 30 are closer to the stator iron core 10. As a result of this, regarding the rigidity of the split flux coils 30 in the split flux coil collective insertion step, that the split flux coils 30 that are close to the stator iron core 10, or in other words, the split flux coils 30 to be initially inserted in the slots 10a is less than that of the split flux coils 30 to be inserted thereafter. Since the flexibility of the split flux coils 30 increases as the rigidity of the split flux coils 30 decreases, it is easy to insert the split flux coils 30 into the slots 10a. Therefore, the split flux coils 30 to be initially inserted in the slots 10a are reliably inserted into the slots 10a. In addition, it is more difficult to deform the split flux coils 30 as the rigidity of the split flux coils 30 increases. Therefore, it is more difficult to deform the split flux coils 30 that are close to the pusher 103, or in other words, the split flux coils 30 to be inserted into the slots 10a later than it is to deform the split flux coils 30 that are close to the stator iron core 10. Accordingly, it is possible to perform insertion into the slots 10a by reliably pressing the split flux coils 30 for which insertion was previously started with each split flux coil 30 to be inserted into the slots 10a later, which are difficult to deform. As a result of this, all of the split flux coils 30 are reliably inserted into each slot 10a.

In addition, in the stator iron core setting step, the length of the conducting wire 30a that constitutes each split flux coil 30 to be respectively inserted in lamellar form between each blade 102 is set so as to decrease the further the split flux coils 30 are from the stator iron core 10. As a result of this, the conducting wire 30a is reduced by the extent to which each split flux coil 30 is far from the stator iron core 10, or in other words, by the extent to which the split flux coils 30 are further on the inner circumferential side than the split flux coils 30 on the outer circumferential side. Therefore, it is possible to suppress the projection length from the end surface of the stator iron core 10 of the coil ends 30c on one side of the split flux coils 30 on the inner circumferential side. As a result of this, it is possible to further shorten the length of the conducting wire 30a used in the stator 40; and therefore, it is possible to reduce the electrical resistance of the coils 30U, 30V, and 30W of each phase, and it is possible to reduce the mass of the stator 40. In addition, a molding step that presses the coil ends 30c on one side of the split flux coils 30** on the inner circumferential side that project greatly from the end surface of the stator iron core 10 and restricts the projection amount of the coil ends 30c on one side that project from the end surface of the stator iron core 10 is not required.

In addition, as shown in FIG. 2, the inner diameter A at a position most separated in a direction of projecting from the end surface of the stator iron core 10 on the coil ends 30c on one side of each split flux coil 30** mounted in a state of being inserted in the slots 10a is set to be less than an inner diameter B of the stator iron core 10. The stator 40 of a rotary electric machine is even established in the state shown in FIG. 2. Therefore, a circumstance in which a film formed on the surface of the conducting wire 30a is fractured as a result of molding the coil ends 30c that are further on the inner side than the inner diameter B of the stator iron core 10 to be further on the outer side than the inner diameter B of the stator iron core 10, is prevented.

In addition, the coil 30 of each phase is configured by being divided into the plurality of split flux coils 30. Further, the number of passes of the conducting wire 30a that constitutes each split flux coil 30 mounted in a state of being inserted in a lamellar form by respectively being overlapped in each slot 10a is set so that there are fewer split flux coils 30 on the outer circumferential side than split flux coils 30 on the inner circumferential side. Since the rigidity of the split flux coils 30 decrease as the number of passes of the conducting wire 30a that constitutes each split flux coil 30 decreases, the rigidity of the split flux coils 30 on the outer circumferential side is less than that of the split flux coils 30 on the inner circumferential side. Therefore, the rigidity of the split flux coils 30 on the outer circumferential side, or in other words, the split flux coils 30 to be initially inserted in the slots 10a is less than that of the split flux coils 30 to be inserted thereafter. Since the flexibility of the split flux coils 30 increases as the rigidity of the split flux coils 30 decreases, it is easy to insert the split flux coils 30 into the slots. Therefore, the split flux coils 30** to be initially inserted in the slots 10a are reliably inserted into the slots 10a.

In addition, the number of passes of the conducting wire 30a is lower for the split flux coils 30 on the inner circumferential side than for the split flux coils 30 on the outer circumferential side. Therefore, the rigidity of the split flux coils 30 on the inner circumferential side is greater than that of the split flux coils 30 on the outer circumferential side and it is more difficult to deform the split flux coils 30 on the inner circumferential side. Accordingly, it is more difficult to deform the split flux coils 30 on the inner circumferential side than the split flux coils 30 on the outer circumferential side, or in other words, it is more difficult to deform the split flux coils 30 to be inserted into the slots 10a after than the split flux coils 30 to be initially inserted into the slots 10a. As a result of this, it is possible to perform insertion into the slots 10a by reliably pressing the split flux coils 30 on the outer circumferential side for which insertion was previously started with the split flux coils 30** on the inner circumferential side, which are to be inserted into the slots 10a later and which are difficult to deform.

In this manner, since insertion into the slots 10a is performed as a result of the split flux coils 30 on the outer circumferential side for which insertion was previously being pressed by the split flux coils 30 on the inner circumferential side, which are to be inserted into the slots 10a later, it is possible to perform insertion in a lamellar form as a result of overlapping all of the split flux coils 30** in each slot 10a in a simultaneous manner. As a result of this, the steps required in order to insert the coils 30 of each phase into the slots 10a of the stator iron core 10 are reduced; and therefore, it is possible to provide a rotary electric machine 1 that is capable of manufacture in a shorter period of time.

As shown in FIG. 11, the distance between two slots 10a in which a single split flux coil 30 is inserted decreases in conjunction with positioning closer to the inner side of the stator iron core 10. Therefore, if the length of the conducting wire 30a that constitutes each split flux coil 30 were set to be the same, the projection length from the stator iron core 10 of the coil ends 30c on one side of the split flux coils 30 would increase by an extent to which the split flux coils 30 are positioned further on the inner circumferential side than the split flux coils 30 on the outer circumferential side. In such an instance, the length of a single winding of the conducting wire 30a that constitutes each split flux coil 30 mounted in a state of being inserted in a lamellar form by respectively being overlapped in each slot 10a is set so that the split flux coils 30 on the inner circumferential side are shorter than the split flux coils 30 on the outer circumferential side. Therefore, it is possible to suppress the projection length from the end surface of the stator iron core 10 of the coil ends 30c on one side of the split flux coils 30** on the inner circumferential side. As a result of this, it is possible to further shorten the length of the conducting wire 30a used in the stator 40; and therefore, it is possible to reduce the electrical resistance of the coils 30U, 30V, and 30W of each phase, and it is possible to reduce the mass of the stator 40. In addition, a molding step that presses the coil ends 30c that are positioned on the inner side of the stator iron core 10 and project greatly from the stator iron core 10, and restricts the projection amount of the coil ends 30c that project from the stator iron core 10 is not required.

Embodiment in Which Coils Have Concentric Winding

Figure 13:
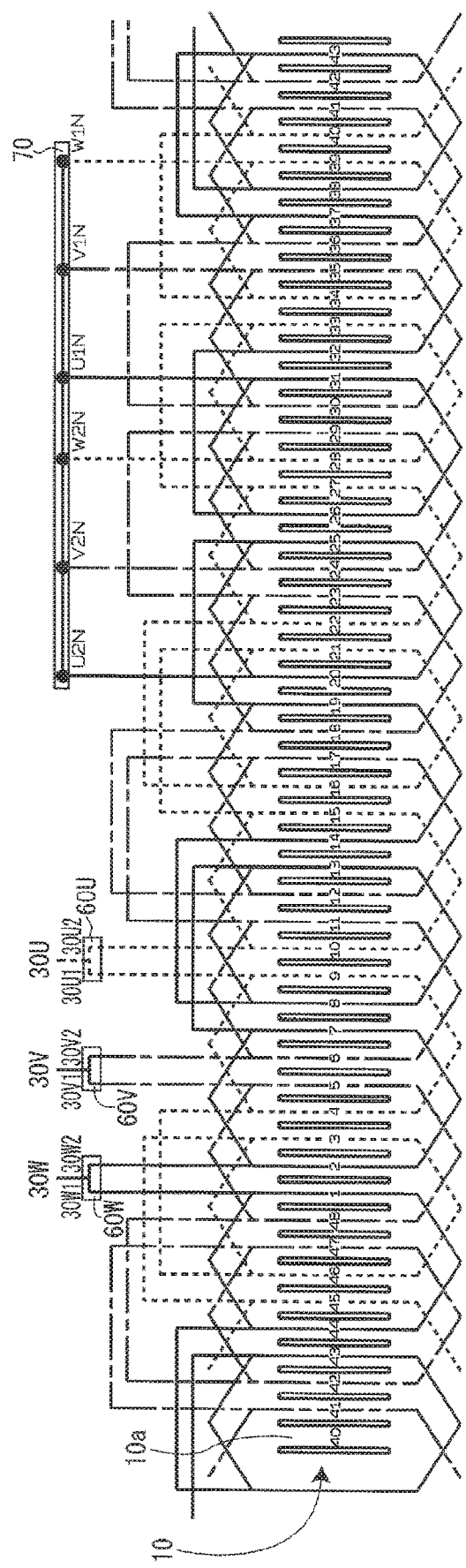
FIG. 13 is an elementary wiring diagram of a coil having a concentric winding configuration that is inserted into a stator iron core.

As shown in FIG. 13, the rotary electric machine 1 and the manufacturing method of the rotary electric machine 1 of the present disclosure can be applied to an embodiment in which the coils 30U, 30V, and 30W of each phase have a concentric winding configuration. In this embodiment, the U-phase coil 30U is also configured by a first U-phase coil 30U1 and a second U-phase coil 30U2. In addition, The V-phase coil 30V is configured by a first V-phase coil 30V1 and a second V-phase coil 30V2. In addition, the W-phase coil 30W is configured by a first W-phase coil 30W1 and a second W-phase coil 30W2.

In this embodiment, the first U-phase coil 30U1 is also divided into a plurality of first U-phase split flux coils 30U1-1 to 30U1-6 when inserted into each slot 10a by a coil insertion machine 100. In the same manner, the second U-phase coil 30U2 is divided into a plurality of second U-phase split flux coils 30U2-1 to 30U2-6. In the same manner, the first V-phase coil 30V1 is divided into a plurality of first V-phase split flux coils 30V1-1 to 30V1-6. In the same manner, the second V-phase coil 30V2 is divided into a plurality of second V-phase split flux coils 30V2-1 to 30V2-6. In the same manner, the first W-phase coil 30W1 is divided into a plurality of first W-phase split flux coils 30W1-1 to 30W1-6. In the same manner, the second W-phase coil 30W2 is divided into a plurality of second W-phase split flux coils 30W2-1 to 30W2-6.

In the coil setting step, the split flux coils 30U1-1 to 30U1-6, 30U2-1 to 30U2-6, 30V1-1 to 30V1-6, 30V2-1 to 30V2-6, 30W1-1 to 30W1-6, and 30W2-1 to 30W2-6 of each phase are respectively inserted in a lamellar form as a result of being overlapped between the blades 102 in the formation direction of the blades 102 in accordance with the elementary wiring diagram of the coil shown in FIG. 13 by a migration device (not illustrated in the drawings).

In the stator iron core setting step, the number of passes of the conducting wire 30a that constitutes each split flux coil 30U1-1 to 30U1-6, 30U2-1 to 30U2-6, 30V1-1 to 30V1-6, 30V2-1 to 30V2-6, 30W1-1 to 30W1-6, and 30W2-1 to 30W2-6 mounted in a state of being respectively inserted between each blade 102 is set to be smaller as the split flux coils **30\*\* are closer to the stator iron core 10. In addition, in the stator iron core setting step, the length of the conducting wire 30a that constitutes each split flux coil 30U1-1 to 30U1-6, 30U2-1 to 30U2-6, 30V1-1 to 30V1-6, 30V2-1 to 30V2-6, 30W1-1 to 30W1-6, and 30W2-1 to 30W2-6 mounted in a state of being respectively inserted between each blade 102 is set so as to decrease the further the split flux coils 30\*\* are from the stator iron core 10**.

In the split flux coil collective insertion step, when the pusher 103 is moved to the stator iron core 10 side, among the split flux coils **30\*\* of each phase, a portion that projects further on the inner circumferential side than the blades 102 is pushed up to the stator iron core 10 side by each pushing section 103b of the pusher 103. When this occurs, the split flux coils 30\*\* are inserted in a lamellar form as a result of being sequentially overlapped in sequential slots 10a from a split flux coils 30\*\* that are on the stator iron core 10 side (the upper side). In this manner, even in an embodiment in which the coils 30U, 30V, and 30W of each phase have a concentric winding configuration, it is possible to perform insertion in a lamellar form as a result of respectively sequentially overlapping the plurality of split flux coils 30\*\* of each phase in the slots 10a**.

Other Embodiment

In the embodiments described above, the number of phases of the coil 30 is 3. However, the rotary electric machine 1 of the present embodiment may be rotary electric machine 1 in which the number of phases of the coil 30 is 2 or 4 or more.

A manufacturing method of a rotary electric machine according to an aspect of this disclosure includes a stator provided with a stator iron core, which is cylindrical and in which a plurality of slots are formed in a circumferential direction on an inner circumferential surface, and coils of a plurality of phases that are each inserted into the plurality of slots, and a movable element provided with a movable element iron core that is supported in a rotatable manner relative to the stator and at least a pair of movable element magnetic poles that is provided in the movable element iron core, and the method including a split flux coil formation step of, for each phase, forming split flux coils in which the coils of the plurality of phases are divided into a plurality of the split flux coils from a conducting wire, a coil setting step of performing insertion in a lamellar form between blades of a coil insertion machine by overlapping the plurality of split flux coils of each phase in a formation direction of the blades, the coil insertion machine being provided with a plurality of the blades, which are rod-shaped and disposed spatially separated from one another around a circumference, and a pusher, which is disposed on the inner side of each blade so as to face an inner side portion of each blade, and which moves in the formation direction of the blades, a stator iron core setting step of setting the stator iron core in the coil insertion machine so that a position of each of the slots conforms with a position of a gap formed between the blades, and a split flux coil collective insertion step of performing insertion in a lamellar form by pressing, with a plurality of split flux coils that are respectively inserted between the blades and that are on the pusher side, split flux coils that are closer to the stator iron core side than the plurality of split flux coils that are on the split flux coils that are on the pusher side as a result of moving the pusher to the stator iron core side, and sequentially overlapping the plurality of split flux coils of each phase in each slot in a simultaneous manner.

In this manner, the coils are divided into the plurality of split flux coils, and in the split flux coil collective insertion step, the split flux coils that are closer to the stator iron core side than a plurality of the split flux coils that are respectively inserted between each blade, which are on the pusher side, are pressed by the plurality of split flux coils on the pusher side as a result of moving the pusher to the stator iron core side, and the plurality of the split flux coils of each phase are inserted in a lamellar form as a result of respectively being sequentially overlapped in each slot in a simultaneous manner. In this manner, since the coils are divided in the plurality of split flux coils, the rigidity of the split flux coils is lower than that of coils that are not divided; and therefore, it is easy to deform the split flux coils. Therefore, in the split flux coil collective insertion step, it is possible to perform insertion in a lamellar form as a result of overlapping the split flux coils of all of the phases in each slot of the stator iron core in a simultaneous manner. As a result of this, it is possible to greatly reduce the steps required in order to insert the coil of each phase. In addition, in the manner of the related art, intermediate molding that deforms the coil ends on one side of the coils inserted into the slots to the outer circumferential side of the stator iron core in order to avoid hindering the insertion of the coils to be subsequently inserted into the slots after inserting the coils of a single phase into the slots of the stator iron core, is not required. In this manner, it is possible to greatly reduce the steps required in order to insert the coils of each phase; and therefore, it is possible to provide a manufacturing method of a rotary electric machine that is capable of manufacturing in a shorter period of time.

The manufacturing method of a rotary electric machine according to the aspect of this disclosure may be configured such that, in the stator iron core setting step, the number of passes of the conducting wire that constitutes each split flux coil that is inserted in a lamellar form by being overlapped between the blades is set to be smaller as each split flux coil is closer to the stator iron core.

The manufacturing method of a rotary electric machine according to the aspect of this disclosure may be configured such that, in the stator iron core setting step, the length of a single winding of the conducting wire that constitutes each split flux coil that is inserted in a lamellar form by being overlapped between the blades is set to be shorter as each split flux coil is further from the stator iron core.

A rotary electric machine according to an aspect of this disclosure includes: a stator that includes a stator iron core, which is cylindrical and in which a plurality of slots are formed in a circumferential direction on an inner circumferential surface, and coils of a plurality of phases that are mounted in a state of being respectively inserted into the plurality of slots; and a movable element that includes a movable element iron core, which is supported in a rotatable manner relative to the stator and at least a pair of movable element magnetic poles that is provided in the movable element iron core, in which the coils of the plurality of phases are configured by being respectively divided into a plurality of split flux coils, the plurality of split flux coils are mounted in a state of being inserted in a lamellar form by respectively being overlapped in each slot, and an inner diameter of a coil end, at a position most separated from an end surface in a direction of projecting of the stator iron core on one side of each split flux coil mounted in a state of being inserted into the slots, is set to be smaller than the inner diameter of the stator iron core.

The rotary electric machine according to the aspect of this disclosure may be configured such that the number of passes of the conducting wire that constitutes each split flux coil mounted in a state of being inserted in a lamellar form by respectively being overlapped in each slot is set so that there are fewer split flux coils on an outer circumferential side than split flux coils on an inner circumferential side.

The rotary electric machine according to the aspect of this disclosure may be configured such that the length of a single winding of the conducting wire that constitutes each split flux coil mounted in a state of being inserted in a lamellar form by respectively being overlapped in each slot is set so that the split flux coils on an inner circumferential side are shorter than the split flux coils on an outer circumferential side.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A manufacturing method of a rotary electric machine including a stator provided with a stator iron core, which is cylindrical and in which a plurality of slots are formed in a circumferential direction on an inner circumferential surface, and coils of a plurality of phases that are each inserted into the plurality of slots, and a movable element provided with a movable element iron core that is supported in a rotatable manner relative to the stator and at least a pair of movable element magnetic poles that is provided in the movable element iron core, the method comprising:
a split flux coil formation step of, for each phase, forming split flux coils in which the coils of the plurality of phases are divided into a plurality of the split flux coils from a conducting wire;
a coil setting step of performing insertion in a lamellar form between blades of a coil insertion machine by overlapping the plurality of split flux coils of each phase in a formation direction of the blades, the coil insertion machine being provided with a plurality of the blades, which are rod-shaped and disposed spatially separated from one another around a circumference, and a pusher, which is disposed on the inner side of each blade so as to face an inner side portion of each blade, and which moves in the formation direction of the blades;
a stator iron core setting step of setting the stator iron core in the coil insertion machine so that a position of each of the slots conforms with a position of a gap formed between the blades; and
a split flux coil collective insertion step of performing insertion in a lamellar form by pressing, with a plurality of split flux coils that are respectively inserted between the blades and that are on the pusher side, split flux coils that are closer to the stator iron core side than the plurality of split flux coils that are on the split flux coils that are on the pusher side as a result of moving the pusher to the stator iron core side, and sequentially overlapping the plurality of split flux coils of each phase in each slot in a simultaneous manner.

2. The manufacturing method of a rotary electric machine according to claim 1,
wherein, in the stator iron core setting step, the number of passes of the conducting wire that constitutes each of the split flux coils that is inserted in a lamellar form by being overlapped between the blades is set to be smaller as each split flux coil is closer to the stator iron core.

3. The manufacturing method of a rotary electric machine according to claim 1,
wherein, in the stator iron core setting step, the length of a single winding of the conducting wire that constitutes each split flux coil that is inserted in a lamellar form by being overlapped between the blades is set to be shorter as each split flux coil is further from the stator iron core.

4. A rotary electric machine comprising:
a stator that includes a stator iron core, which is cylindrical and in which a plurality of slots are formed in a circumferential direction on an inner circumferential surface, and coils of a plurality of phases that are mounted in a state of being respectively inserted into the plurality of slots; and
a movable element that includes a movable element iron core, which is supported in a rotatable manner relative to the stator and at least a pair of movable element magnetic poles that is provided in the movable element iron core,
wherein the coils of the plurality of phases are configured by being respectively divided into a plurality of split flux coils, the plurality of split flux coils are mounted in a state of being inserted in a lamellar form by respectively being overlapped in each slot, and an inner diameter of a coil end, at a position most separated from an end surface in a direction of projecting of the stator iron core on one side of each split flux coil mounted in a state of being inserted into the slots, is set to be smaller than the inner diameter of the stator iron core.

5. The rotary electric machine according to claim 4, wherein the number of passes of the conducting wire that constitutes each split flux coil mounted in a state of being inserted in a lamellar form by respectively being overlapped in each slot is set so that there are fewer split flux coils on an outer circumferential side than split flux coils on an inner circumferential side.

6. The rotary electric machine according to claim 4, wherein the length of a single winding of the conducting wire that constitutes each split flux coil mounted in a state of being inserted in a lamellar form by respectively being overlapped in each slot is set so that the split flux coils on an inner circumferential side are shorter than the split flux coils on an outer circumferential side.

* * * * *